United States Patent
Bloom et al.

(10) Patent No.: US 9,873,441 B1
(45) Date of Patent: Jan. 23, 2018

(54) RAIL VEHICLE BASED DEPLOYABLE GAGE RESTRAINT MEASUREMENT SYSTEM

(71) Applicant: ENSCO, Inc., Falls Church, VA (US)

(72) Inventors: Jeffrey Alan Bloom, Silver Spring, MD (US); Jacinda Leah Clemenzi, Falls Church, VA (US); Anthony Kwan Kim, Fairfax, VA (US); Corey Adam Merdler, Leesburg, VA (US); Tarek Sameh Shalaby, Fairfax, VA (US)

(73) Assignee: Ensco, Inc., Falls Church, VA (US)

( * ) Notice: Subject to any disclaimer, the term of this patent is extended or adjusted under 35 U.S.C. 154(b) by 0 days.

(21) Appl. No.: 15/228,444

(22) Filed: Aug. 4, 2016

(51) Int. Cl.
*G01L 1/04* (2006.01)
*B61K 9/08* (2006.01)
*B61L 23/04* (2006.01)
*G01M 5/00* (2006.01)

(52) U.S. Cl.
CPC .............. *B61K 9/08* (2013.01); *B61L 23/04* (2013.01); *G01M 5/0058* (2013.01)

(58) Field of Classification Search
CPC ......... B61K 9/08; B61L 23/04; G01M 5/0058
USPC .................................................. 73/862.631
See application file for complete search history.

(56) References Cited

U.S. PATENT DOCUMENTS

| | | |
|---|---|---|
| 441,014 A | 11/1890 | Mahood |
| 1,190,796 A | 7/1916 | Pollard |
| 2,829,438 A | 4/1958 | Cutler |
| 3,505,742 A | 4/1970 | Fiechter |
| 3,543,576 A | 12/1970 | Bishop |
| 3,557,882 A * | 1/1971 | Richey ............... A01B 3/464 172/223 |
| 3,630,077 A | 12/1971 | Boileau |
| 3,643,503 A | 2/1972 | Plasser |
| 3,718,040 A | 2/1973 | Freeman |
| 3,808,693 A | 5/1974 | Plasser |
| 3,816,927 A | 6/1974 | Theurer |
| 3,869,907 A | 3/1975 | Plasser |
| 3,968,752 A | 7/1976 | Theurer |
| 4,044,594 A | 8/1977 | Owens |
| 4,095,374 A | 6/1978 | Ugo |
| 4,468,966 A | 9/1984 | Bradshaw |

(Continued)

FOREIGN PATENT DOCUMENTS

| | | |
|---|---|---|
| DE | 2224966 A1 | 12/1973 |
| JP | 1059025 A | 3/1989 |
| JP | 6124121 A | 5/1994 |

*Primary Examiner* — Max Noori
(74) *Attorney, Agent, or Firm* — Nixon Peabody LLP; Jeffrey L. Costellia

(57) ABSTRACT

A deployable gage restraint measurement system includes a measurement axle assembly, a cross member, first and second support frames, first and second load cylinders, first and second swing arms, and an anti-rotation arm. The first and the second support frames are each pivotally coupled to the cross member. The first load cylinder is pivotally coupled to the first support frame and the second load cylinder is pivotally coupled to the second support frame. The first swing arm is pivotally coupled to (i) the first load cylinder about a first axis of the first swing arm, (ii) the first support frame about a second axis of the first swing arm, and (iii) the measurement axle assembly about a third axis of the first swing arm. The anti-rotational arm is pivotally coupled to (i) the first support frame and (ii) the measurement axle assembly.

51 Claims, 16 Drawing Sheets

(56) References Cited

U.S. PATENT DOCUMENTS

| | | | |
|---|---|---|---|
| 4,529,241 | A | 7/1985 | Jungbert |
| 4,662,224 | A | 5/1987 | Turbe |
| 4,679,447 | A | 7/1987 | Sieradzki |
| 4,696,506 | A | 9/1987 | Leo |
| RE32,631 | E | 3/1988 | Layer |
| 5,033,793 | A * | 7/1991 | Quintile .................. A61G 5/12 297/423.33 |
| 5,203,089 | A | 4/1993 | Trefouel |
| 5,614,676 | A | 3/1997 | Dull |
| 5,649,490 | A | 7/1997 | Lovitt |
| 5,756,903 | A | 5/1998 | Norby |
| 5,778,798 | A | 7/1998 | VanDenberg |
| 6,293,022 | B1 | 9/2001 | Chino |
| 6,405,141 | B1 | 6/2002 | Carr |
| 6,725,782 | B1 * | 4/2004 | Bloom .................... B61K 9/08 104/2 |
| 7,007,561 | B1 | 3/2006 | Otto |
| 7,254,896 | B2 | 8/2007 | Carr |
| 7,311,010 | B2 | 12/2007 | Otto |
| 7,337,682 | B2 | 3/2008 | Otto |
| 2003/0172837 | A1 | 9/2003 | Whiston |
| 2004/0244637 | A1 * | 12/2004 | Schneider ................ B61K 9/08 105/157.1 |
| 2013/0341156 | A1 * | 12/2013 | Vogeley, Jr. ........... B26D 5/007 198/340 |
| 2016/0075397 | A1 * | 3/2016 | Juan ....................... B62K 11/10 180/220 |

* cited by examiner

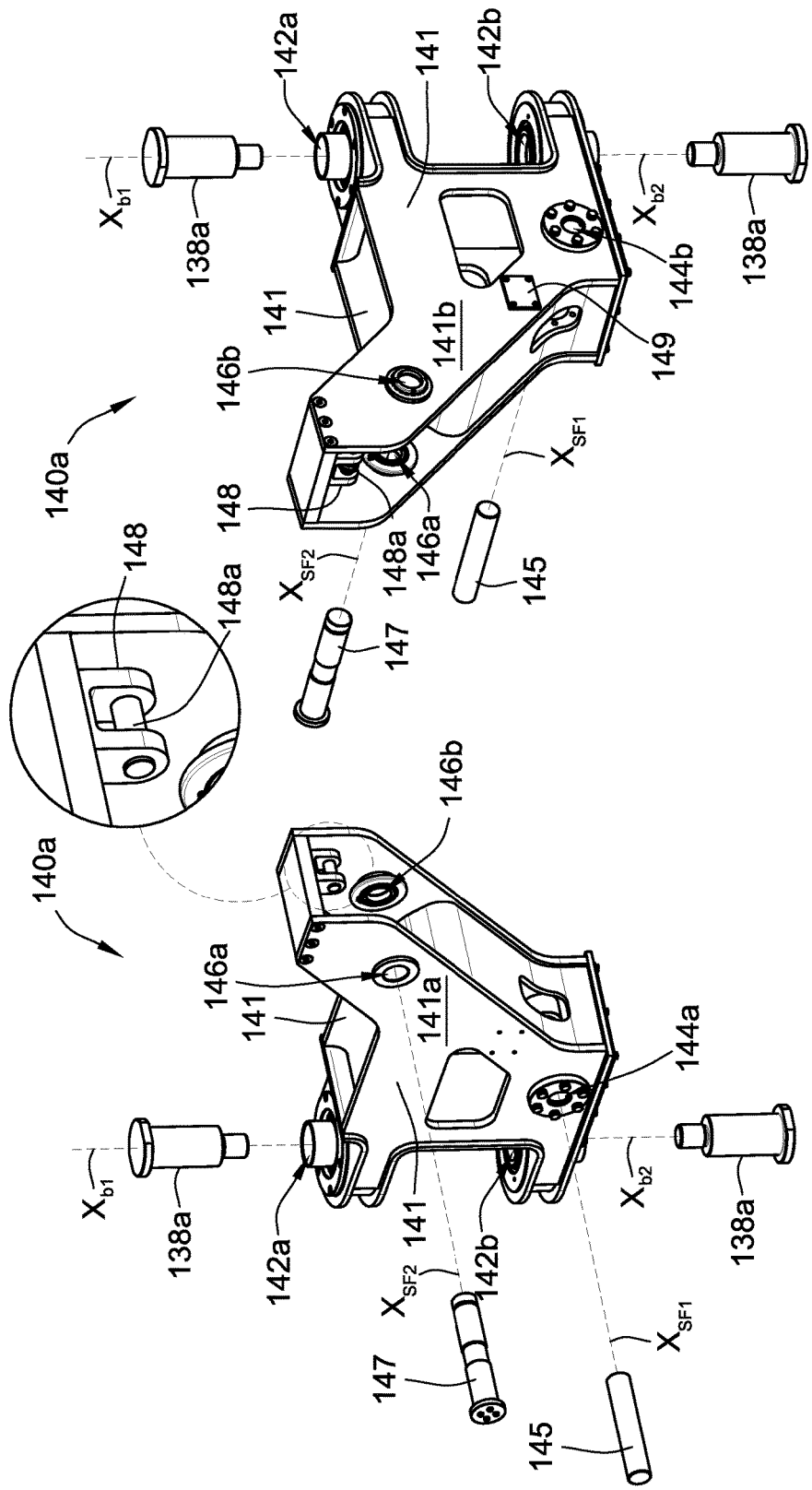

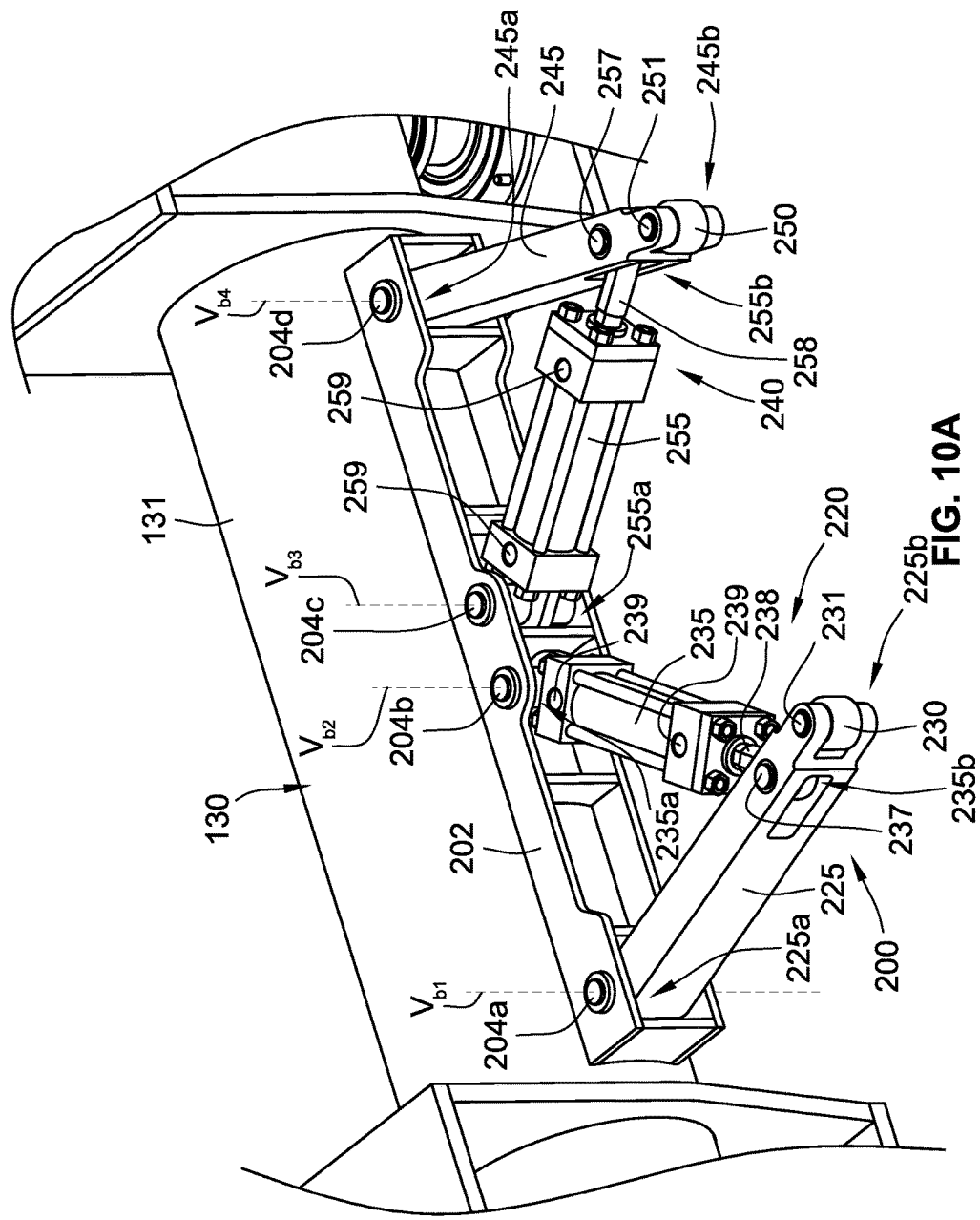

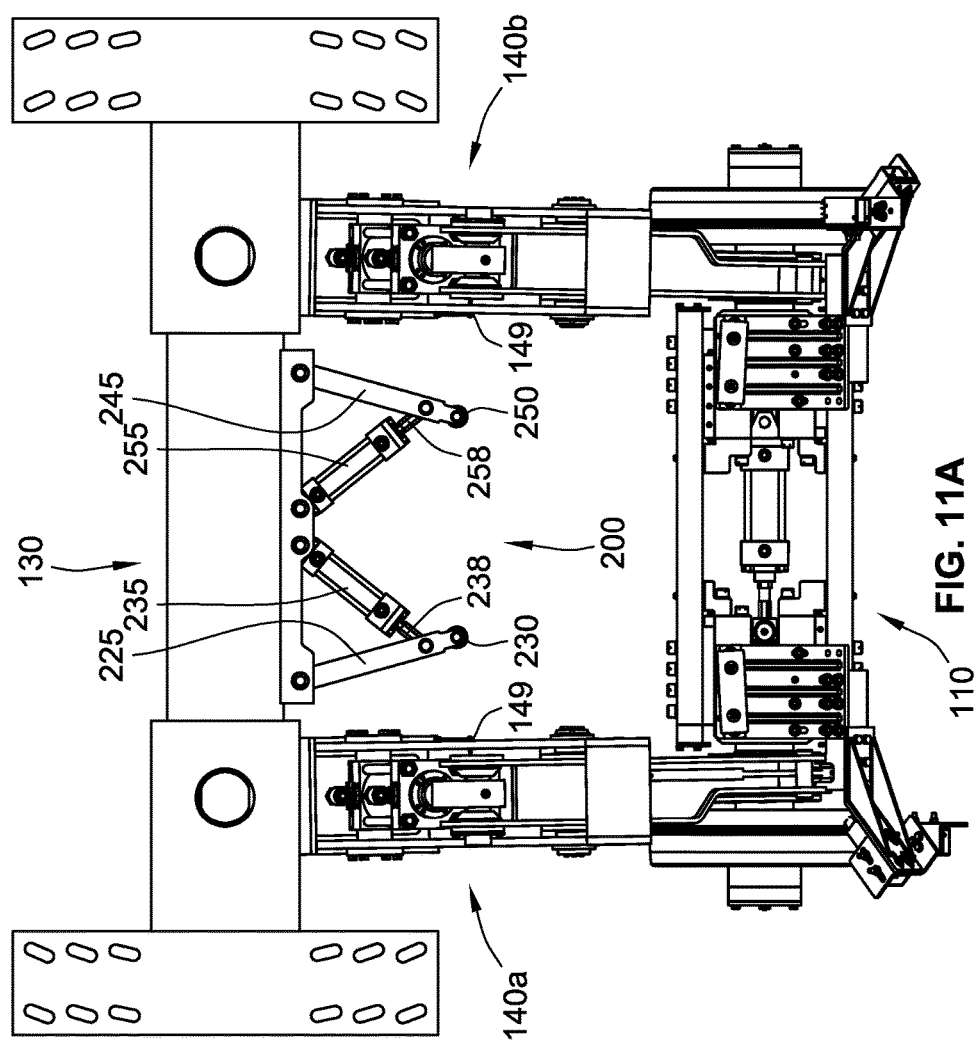

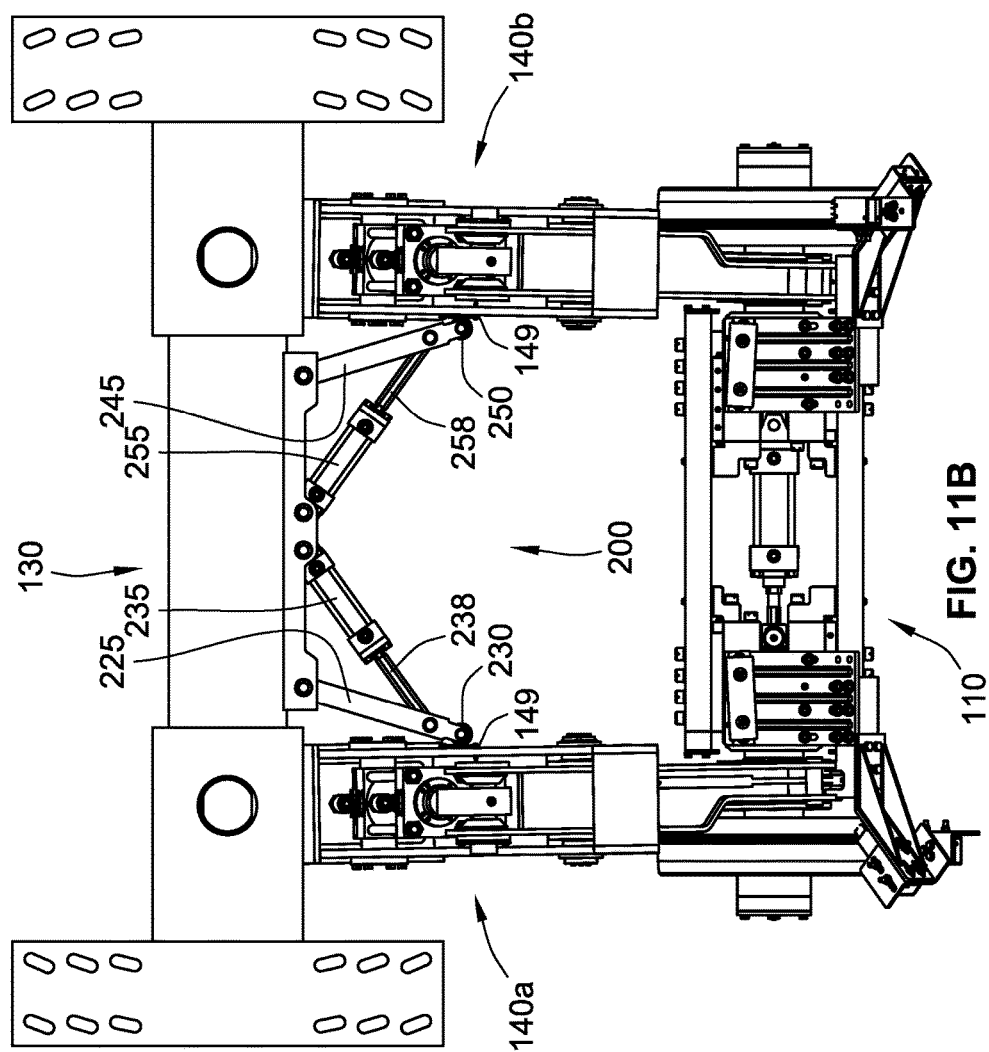

RAIL VEHICLE BASED DEPLOYABLE GAGE RESTRAINT MEASUREMENT SYSTEM

TECHNICAL FIELD

This disclosure relates to deployable gage restraint measurement systems and more specifically to light weight deployable gage restraint measurement systems.

BACKGROUND

Railroad tracks include two generally parallel rails that are attached to cross ties embedded in stone ballast using a variety of fasteners and methods. Each of the parallel rails comprises a number of individual rails that are attached together to form the entire length of the rail. Over time, the fasteners between the rails and/or the fasteners holding the rails to the cross ties can become loosened, damaged, missing, or the cross ties themselves can become rotten, cracked, or damaged, thereby requiring maintenance of the track. Identifying the specific locations on a railroad track that need maintenance is a round-the-clock job that requires large, heavy, machinery operated by experienced workers to replace or repair components.

One way to identify the locations needing maintenance is by using a gage restraint measurement system that has steel flanged wheels to apply loads to the rails and is pulled along the track by a full-size railroad car (i.e., a railbound train car that is only able to ride along a railroad track). The gage restraint measurement system applies an outward or lateral load to each of the rails through the flanged wheels while simultaneously applying a vertical load, the lateral load urging the rails away from each other, the vertical force keeping the gage restraint system wheel flanges from over-riding the rail heads. If the fasteners holding one or both of the rails in a particular location were loosened, missing, and/or damaged, or the cross ties have lost integrity, the rails could move laterally, thereby increasing the gage of the rails. By gage of the rails it is meant the distance between the inside surface of the two parallel rails (e.g., measured 16 millimeters below the top surface of the rails). It is this movement of the rails (e.g., the change in the gage) resulting from the lateral load applied by the gage restraint measurement system that is measured and analyzed to determine where the track requires maintenance.

Prior gage restraint measurement systems were mounted under a full-size railbound railroad car (i.e., a train car that is only able to ride along a railroad track) by replacing one of the railroad car running axles with a specially designed axle capable of applying the gage restraint measurement system loads to the rails. Later gage restraint measurement systems were mounted under a full-size railbound railroad car in a deployable fashion such that a measurement axle assembly of the gage restraint measurement system was able to be lifted and lowered relative to the track such that when the gage restraint measurement system was not in use, the measurement axle assembly would be lifted off the rails and not be worn unnecessarily (e.g., reducing wear and tear, etc.).

However, some of these deployable gage restraint measurement systems were attached to the underside of a full-size railroad cars via a cross member and attached to the cross member were two laterally spaced very large and heavy trunnions. The trunnions were necessary such that the gage restraint measurement system could tilt relative to the underside of the railroad car to accommodate cross level in the track (e.g., height difference of the two generally parallel rails) and vehicle body movement on its suspension. Extending from each of the trunnions was a support frame. Attached to each of the support frames was a pair of linkages, which included an upper swing arm and a lower swing arm. The upper and lower swing arms were both attached at one of their ends to a respective one of the support frames and at the other of their ends to a respective end of the measurement axle assembly.

While these prior gage restraint measurement systems were able to deploy the measurement axle when needed, these prior gage restraint measurement systems required many very large and heavy components to do so (e.g., two trunnions, two pairs of upper and lower swing arms, etc.). As such, these prior gage restraint measurement systems needed to be mounted on very large vehicles, such as, for example, a full-size railbound railroad car. Further, in part due to the extreme weight of the these prior gage restraint measurement systems, the prior gage restraint measurement systems needed to be deployed (e.g. lowered into place prior to use) on a level track with no cross level because the cross level of the track would cause the gage restraint measurement system to swing to the lower side of the track during deployment, which could damage the gage restraint measurement system and/or cause the measurement axle to be misaligned with the track once deployed.

Thus, a need exists for relatively lighter deployable gage restraint measurement systems (e.g., by having relatively smaller and fewer mechanical parts) such that the gage restraint measurement systems can be deployed from lighter weight vehicles and vehicles with less available space (e.g., a hi-rail vehicle that can also be driven on standard roads to the rail test location or smaller railbound vehicles). There is also a need for gage restraint measurement systems that can be deployed on tracks with some cross level. The present disclosure is directed to solving these problems and addressing other needs.

BRIEF SUMMARY

According to some implementations of the present disclosure, a deployable gage restraint measurement system ("DGRMS") includes a measurement axle assembly having a measurement-axle axis therethrough. The DGRMS further includes a cross member and a support frame pivotally coupled to the cross member. The DGRMS further includes a load cylinder pivotally coupled to the support frame and a swing arm pivotally coupled to (i) the load cylinder about a first axis of the swing arm, (ii) the support frame about a second axis of the swing arm, and (iii) the measurement axle assembly about a third axis of the swing arm. The DGRMS further includes an anti-rotational arm pivotally coupled to (i) the support frame and (ii) the measurement axle assembly.

According to some implementations of the present disclosure, a deployable gage restraint measurement system ("DGRMS") includes a cross member, a first support frame pivotally coupled to the cross member, and a second support frame pivotally coupled to the cross member. The DGRMS further includes a measurement axle assembly that is coupled to the first and the second support frames. The DGRMS further includes a self-centering assembly extending from the cross member and being configured to engage the first and the second support frames to aid in maintaining rotational positions of the first and the second support frames during deployment of the measurement axle assembly on a track having cross level.

According to some implementations of the present disclosure, a deployable gage restraint measurement system ("DGRMS") includes a measurement axle assembly, a cross member, a first support frame, a first vertical load cylinder, a first swing arm, and an anti-rotational arm. The measurement axle assembly includes a body, a first axle extending from the body in a first direction, a second axle extending from the body in an opposing second direction, a first wheel coupled to the first axle such that the first wheel is rotatable about a measurement-axle axis, and a second wheel coupled to the second axle such that the second wheel is rotatable about the measurement-axle axis. The first support frame is coupled to the cross member such that the first support frame is rotatable about a first vertical axis. The first vertical load cylinder has a first end and an opposing second end. The first end of the first load cylinder is pivotally coupled to the first support frame. The first swing arm has a first end and an opposing second end. The first end of the first swing arm includes a spherical bearing attached to the first axle. The opposing second end of the first swing arm is pivotally coupled to the opposing second end of the first vertical load cylinder. The first swing arm is pivotally coupled to the first support frame at a portion of the first swing arm between the first end and the opposing second end of the first swing arm. The anti-rotational arm is pivotally coupled to the first support frame and pivotally coupled to the measurement axle assembly such that rotation of the body of the measurement axle assembly about the measurement-axle axis is prevented.

According to some implementations of the present disclosure, a deployable gage restraint measurement system ("DGRMS") includes a measurement axle assembly, a cross member, a first support frame, a second support frame, a first vertical load cylinder, a first swing arm, and a self-centering assembly. The measurement axle assembly includes a body, a first axle extending from the body in a first direction, a second axle extending from the body in an opposing second direction, a first wheel coupled to the first axle such that the first wheel is rotatable about a measurement-axle axis, and a second wheel coupled to the second axle such that the second wheel is rotatable about the measurement-axle axis. The first support frame is coupled to the cross member such that the first support frame is rotatable about a first vertical axis. The second support frame is coupled to the cross member such that the second support frame is rotatable about a second vertical axis spaced from the first vertical axis. The first vertical load cylinder has a first end and an opposing second end. The first end of the first load cylinder is pivotally coupled to the first support frame. The first swing arm has a first end and an opposing second end. The first end of the first swing arm includes a spherical bearing attached to the first axle. The opposing second end of the first swing arm is pivotally coupled to the opposing second end of the first vertical load cylinder. The first swing arm is pivotally coupled to the first support frame at a portion of the first swing arm between the first end and the opposing second end of the first swing arm. The self-centering assembly is coupled to the cross member. The self-centering assembly is configured to engage the first and the second support frames to aid in maintaining (i) a rotational position of the first support frame about the first vertical axis and (ii) a rotational position of the second support frame about the second vertical axis during deployment of the measurement axle assembly on a track having cross level.

According to some implementations of the present disclosure, a deployable gage restraint measurement system ("DGRMS") for use in measuring a gage of a track having two generally parallel rails includes a cross member, a measurement axle assembly, a first support frame, a first vertical load cylinder, a first swing arm, an anti-rotational arm, a second support frame, a second vertical load cylinder, and a second swing arm. The cross member is configured to couple the deployable gage restraint measurement system to a vehicle. The measurement axle assembly includes a body, a first axle extending from the body in a first direction, a second axle extending from the body in an opposing second direction, a first wheel coupled to the first axle such that the first wheel is rotatable about a measurement-axle axis, and a second wheel coupled to the second axle such that the second wheel is rotatable about the measurement-axle axis. The first support frame is coupled to the cross member such that the first support frame is rotatable about a first vertical axis. The first vertical load cylinder has a first end and an opposing second end. The first end of the first load cylinder is pivotally coupled to the first support frame. The first swing arm has a first end and an opposing second end. The first end of the first swing arm includes a first spherical bearing attached to the first axle. The opposing second end of the first swing arm is pivotally coupled to the opposing second end of the first vertical load cylinder. The first swing arm is pivotally coupled to the first support frame at a portion of the first swing arm between the first end and the opposing second end of the first swing arm. The anti-rotational arm is pivotally coupled to the first support frame and pivotally coupled to the measurement axle assembly such that rotation of the body of the measurement axle assembly about the measurement-axle axis is prevented. The second support frame is coupled to the cross member such that the second support frame is rotatable about a second vertical axis. The second vertical load cylinder has a first end and an opposing second end. The first end of the second load cylinder is pivotally coupled to the second support frame. The second swing arm has a first end and an opposing second end. The first end of the second swing arm includes a second spherical bearing attached to the second axle. The opposing second end of the second swing arm is pivotally coupled to the opposing second end of the second vertical load cylinder. The second swing arm is pivotally coupled to the second support frame at a portion of the second swing arm between the first end and the opposing second end of the second swing arm. An extension of the first and the second vertical load cylinders causes the first and the second swing arms to pivot relative to the first and the second support frames in a first rotational direction, thereby deploying the measurement axle assembly onto the track.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

FIG. 6A is a first perspective view of a first support frame of the deployable gage restraint measurement system of FIG. 1;

FIG. 6B is a second perspective view of the first support frame of the deployable gage restraint measurement system of FIG. 1;

FIG. 10A is an assembled perspective view of a self-centering assembly of the deployable gage restraint measurement system of FIG. 1;

FIG. 11A is a top view of the deployable gage restraint measurement system of FIG. 1 illustrating the self-centering assembly in a first or retracted position;

FIG. 11B is a top view of the deployable gage restraint measurement system of FIG. 1 illustrating the self-centering assembly in a second or engaged position;

Figure 1:
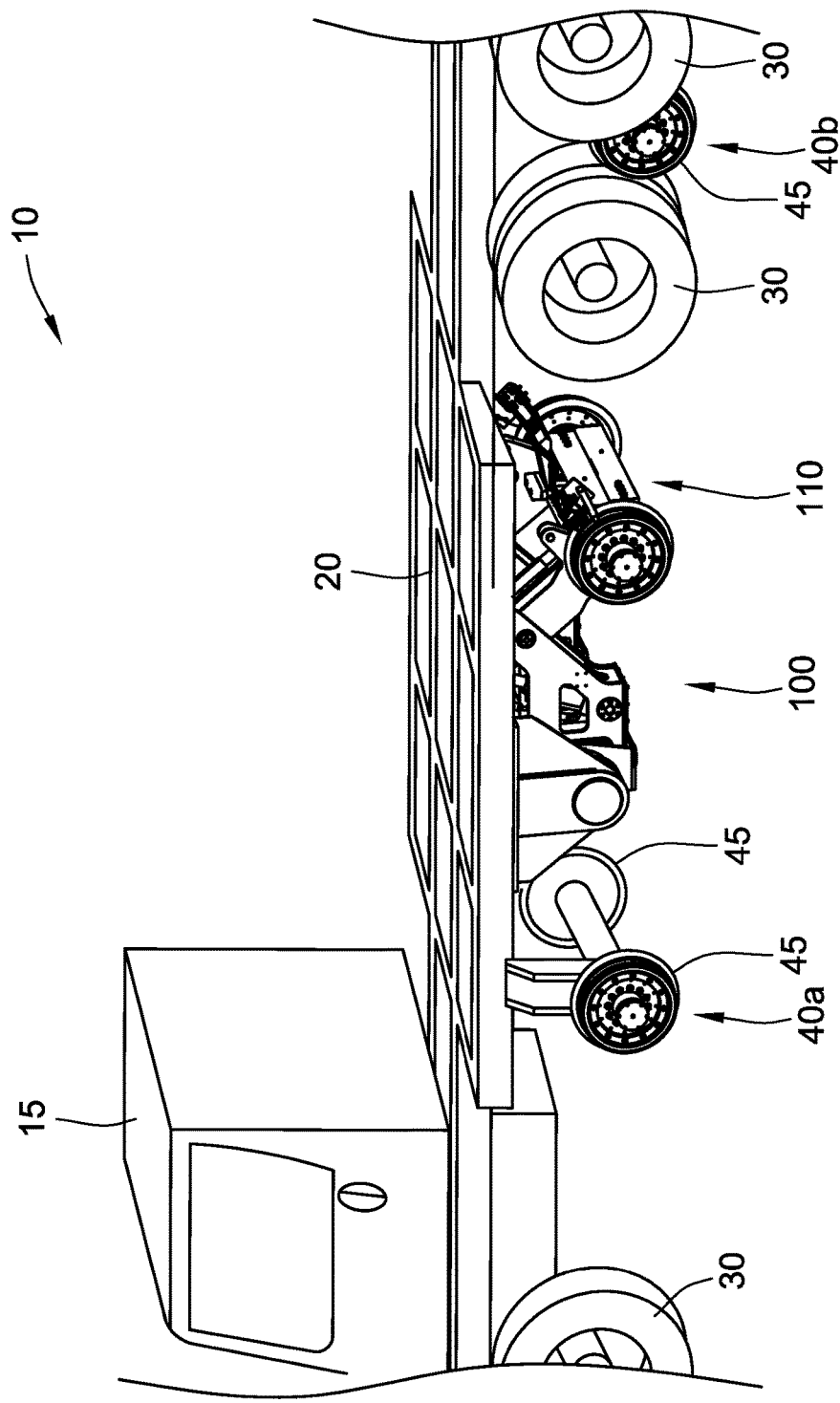
FIG. 1 is a perspective view of a hi-rail vehicle with a deployable gage restraint measurement system coupled thereto according to some implementations of the present disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Referring to FIG. 1, a vehicle 10 includes a cab 15 (e.g., for a driver of the vehicle 10), a frame 20 (e.g., a longitudinal continuous structure of the vehicle 10), a multitude of front and rear tires 30 (e.g., rubber tires) mounted to wheels for use in driving the vehicle 10 on standard roads, and rail wheel assemblies 40a and 40b including rail wheels 45 such that the vehicle 10 can ride along a railroad track on the rail wheels 45. While the vehicle 10 is shown as being a hi-rail vehicle (e.g., a vehicle that can ride on standard roads with the tires 30 and ride on rails of a track with the rail wheel assemblies 40a and 40b), the vehicle 10 can be any type of vehicle, such as, for example, a full-size railroad car, a medium sized or relatively smaller railroad car, a relatively lighter weight railroad car as compared with a full-sized railroad car, a truck, a tractor, etc.

Mounted to an underside of the frame 20 of the vehicle 10 is a deployable gage restraint measurement system 100 of the present disclosure, which is referred to herein as DGRMS 100. The DGRMS 100 is shown in a retracted or stored position as a measurement axle assembly 110 of the DGRMS 100 is positioned relatively higher or more vertical as compared with the wheels 45 of the rail wheel assemblies 40a and 40b. As such, if the vehicle 10 were driven on a railroad track, only the wheels 45 of the rail wheel assemblies 40a and 40b would engage the rails of the track (e.g., until the DGRMS 100 is deployed/lowered).

Figure 12A:
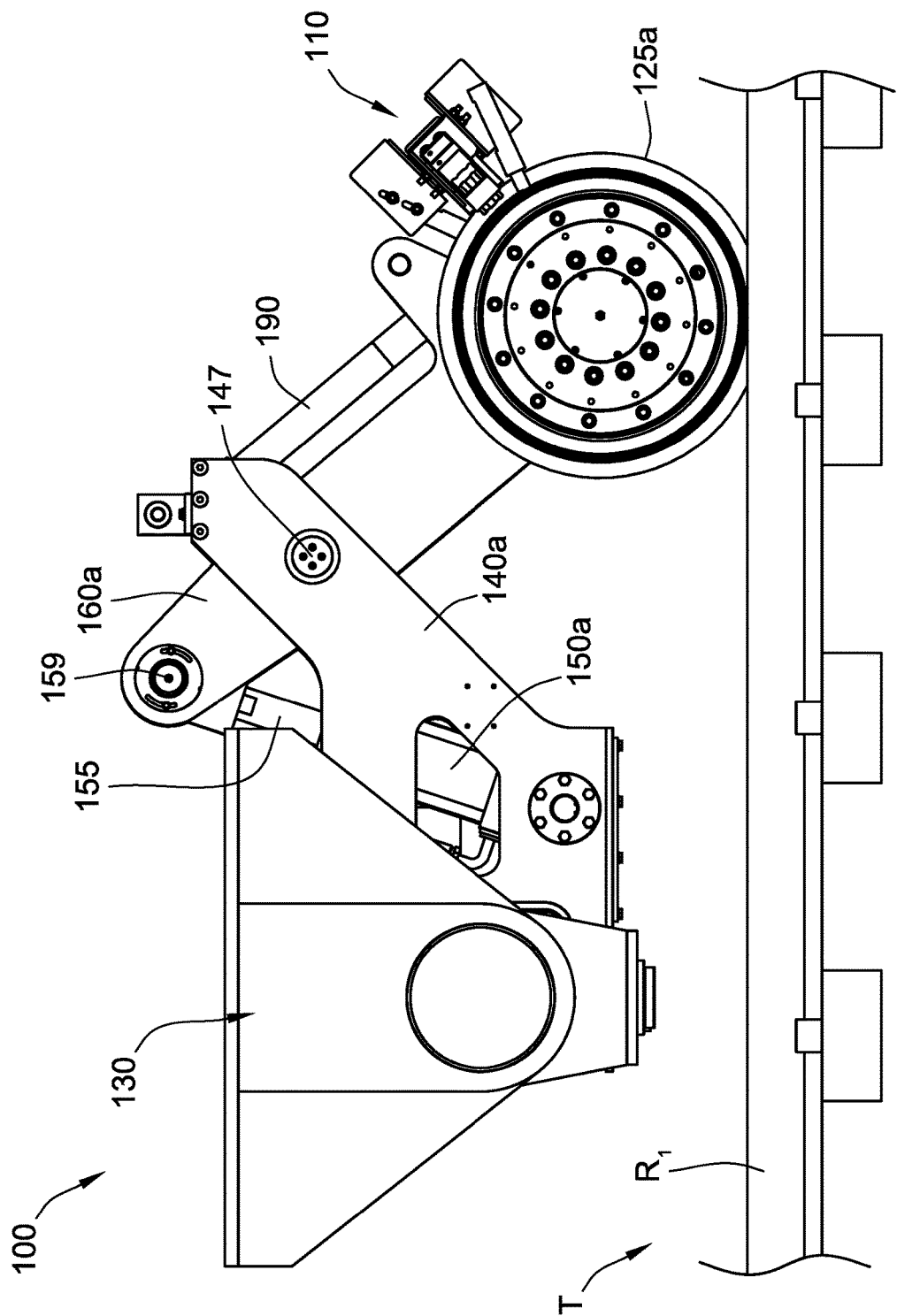
FIG. 12A is a side view of the deployable gage restraint measurement system of FIG. 1 in a first or stored position.
Figure 12B:
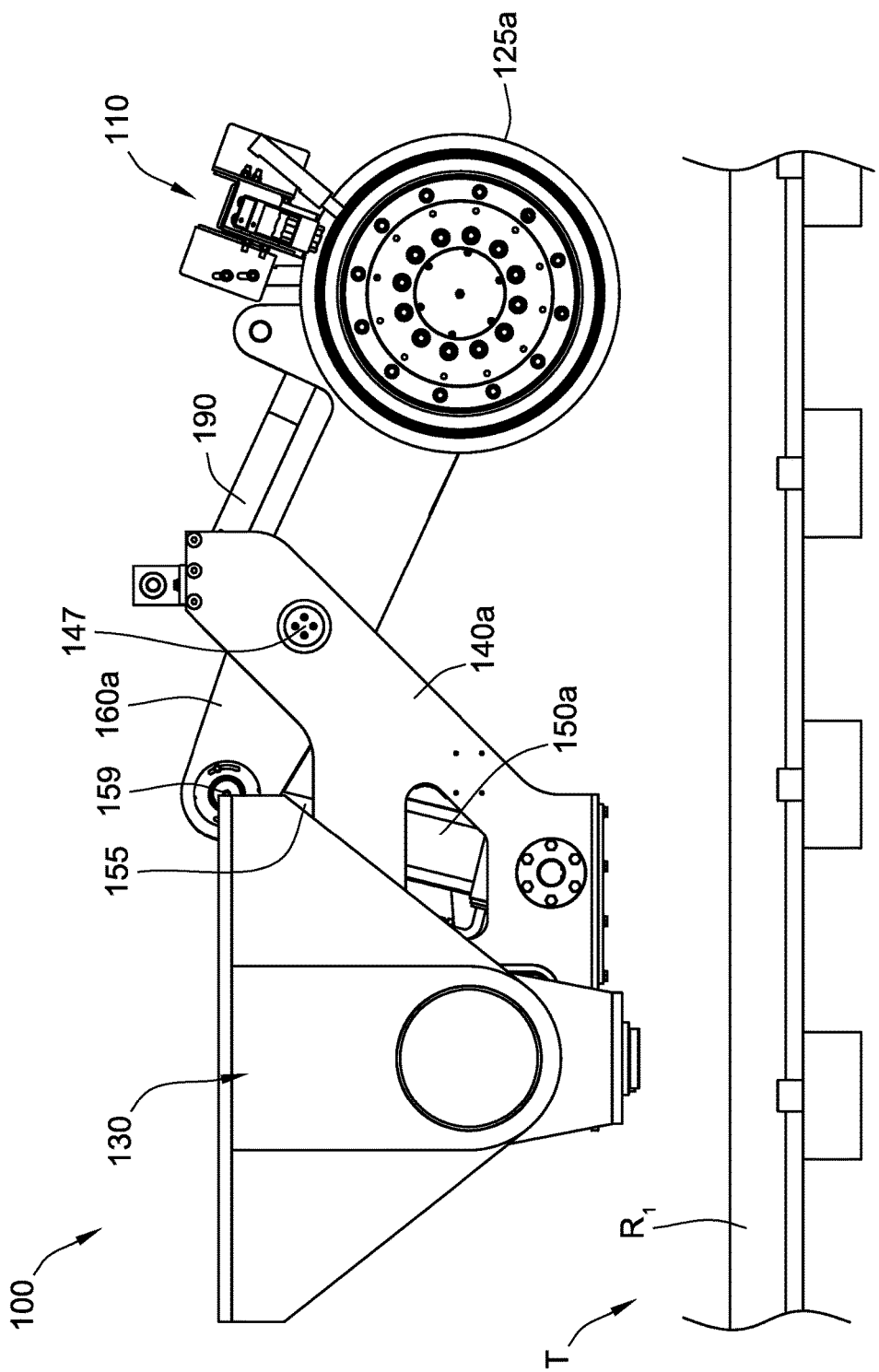
FIG. 12B is a side view of the deployable gage restraint measurement system of FIG. 1 in a second or deployed position.

The DGRMS 100 can deploy the measurement axle assembly 110 from its stored position (FIGS. 1 and 12B) to a deployed or operational position (FIGS. 2 and 12A) and can also cause the measurement axle assembly 110 to be retracted from the deployed or operational position (FIGS. 2 and 12A) back to the stored or retracted position (FIGS. 1 and 12B). When used on a vehicle, such as a hi-rail vehicle, the DGRMS 100 is mounted to the underside of the frame 20 of the vehicle 10, and the DGRMS 100 is able to be transported between sites by road in a relatively easier fashion than some prior systems that needed to be mounted to full-size railroad cars.

Figure 2:
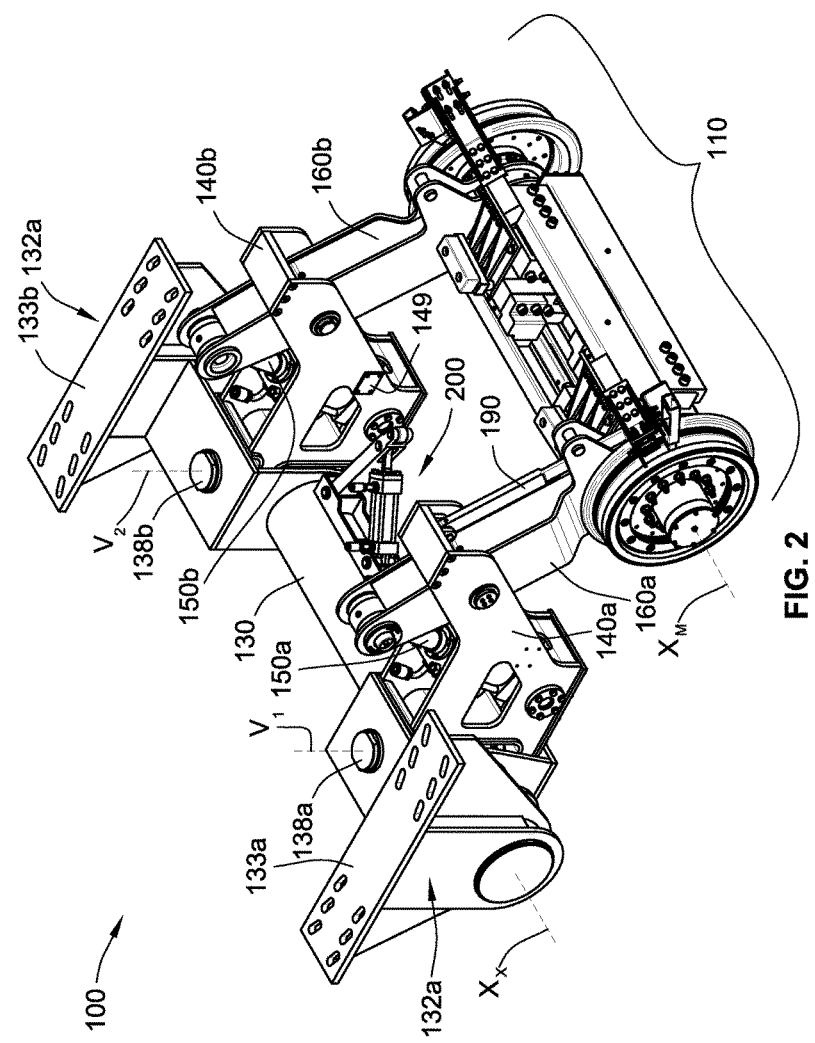
FIG. 2 is an assembled perspective view of the deployable gage restraint measurement system of FIG. 1.
Figure 3:
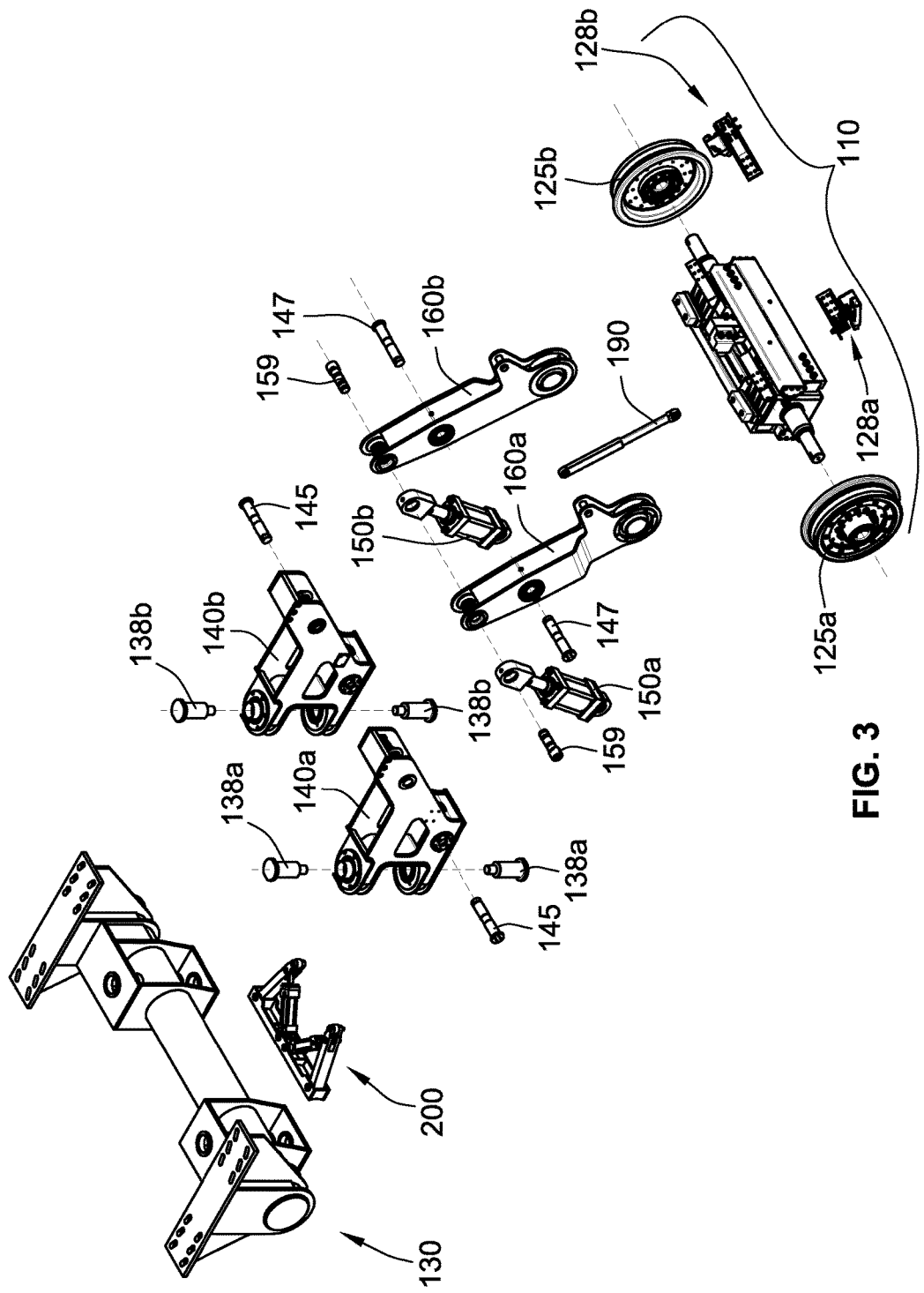
FIG. 3 is a partially exploded perspective view of the deployable gage restraint measurement system of FIG. 1.

Referring to FIG. 2, the DGRMS 100 is removed from the vehicle 10 to better illustrate the DGRMS 100. Generally referring to the assembled view of the DGRMS 100 shown in FIG. 2 and the partially exploded view of the DGRMS 100 shown in FIG. 3, the DGRMS 100 includes the measurement axle assembly 110, a cross member 130, first and second support frames 140a, 140b, first and second vertical load cylinders 150a, 150b, first and second swing arms 160a, 160b, anti-rotation arm 190, and self-centering assembly 200, each of which is described in detail below in reference to additional figures.

The cross member 130 generally attaches the DGRMS 100 to the underside of the frame 20 of the vehicle 10 (FIG. 1). Referring to FIG. 2, the measurement axle assembly 110 is generally coupled to the cross member 130 via a combination of the first and second support frames 140a, 140b and the first and second swing arms 160a, 160b. The first vertical load cylinder 150a is coupled between the first support frame 140a and the first swing arm 160a and the second vertical load cylinder 150b is coupled between the second support frame 140b and the second swing arm 160b such that the first and second vertical load cylinders 150a, 150b can cause the measurement axle assembly 110 to be raised and/or lowered (e.g., deploy the measurement axle assembly 110 and/or store the measurement axle assembly 110).

Figure 4A:
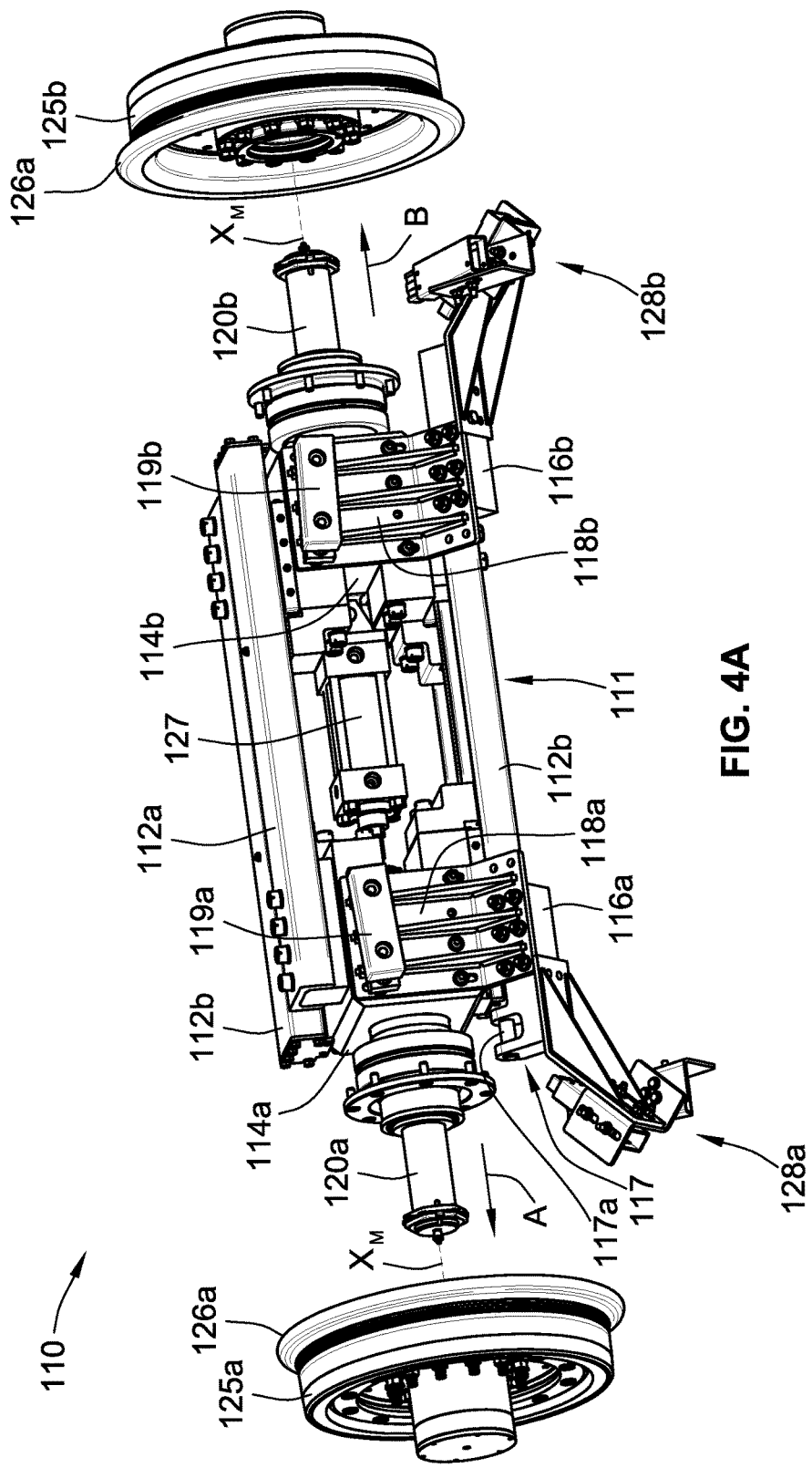
FIG. 4A is a perspective view of a measurement axle assembly (with its wheels detached) of the deployable gage restraint measurement system of FIG. 1.
Figure 4B:
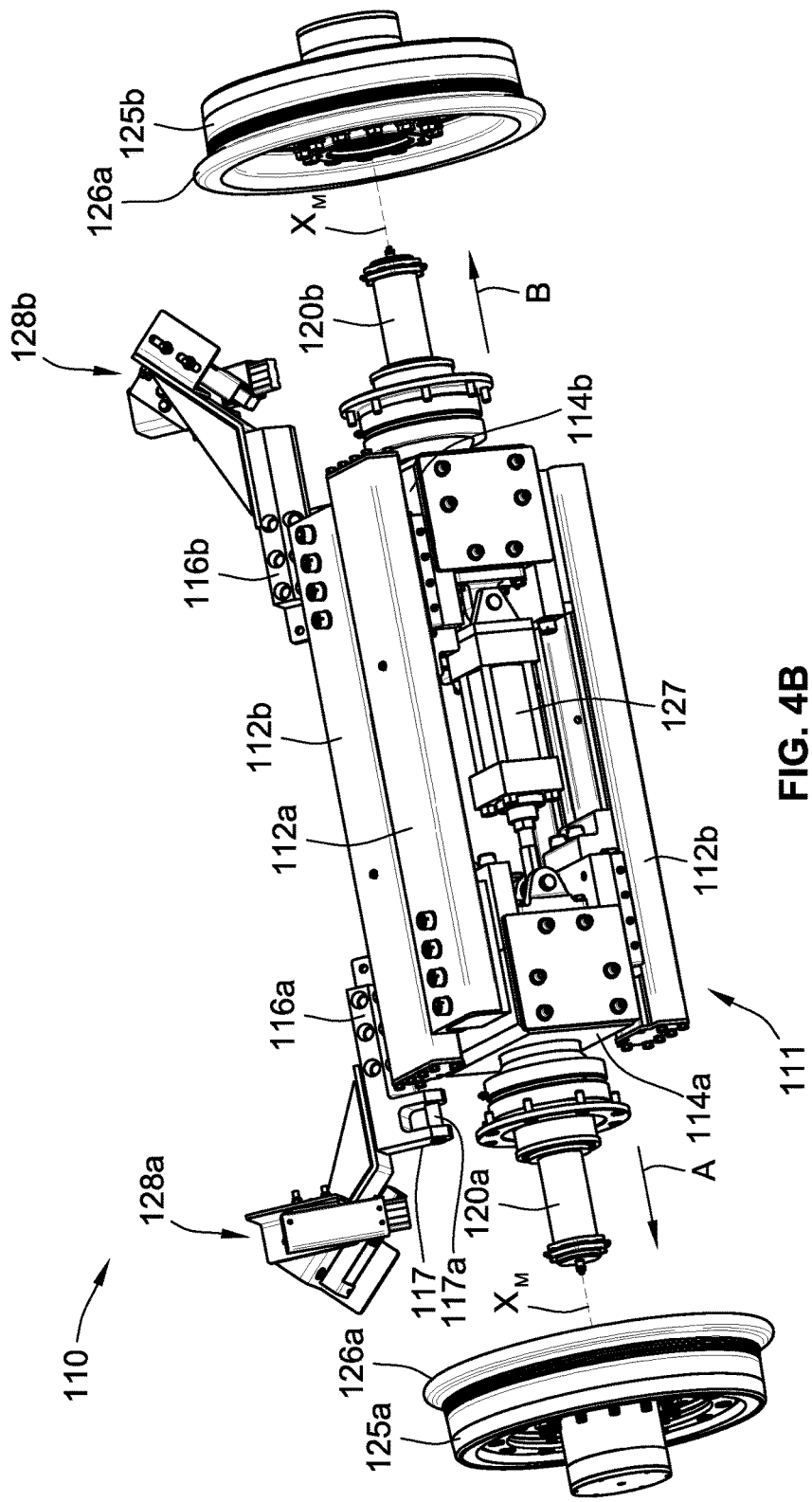
FIG. 4B is another perspective view of the measurement axle assembly (with its wheels detached) of the deployable gage restraint measurement system of FIG. 1.

Referring to FIGS. 4A and 4B, the measurement axle assembly 110 includes a body 111, first and second axles 120a, 120b, and first and second wheels 125a, 125b. The first wheel 125a couples to the first axle 120a such that the first wheel 125a is rotatable about the first axle 120a and a measurement-axle axis $X_m$ of the measurement axle assembly 110. Similarly, the second wheel 125b couples to the second axle 120b such that the second wheel 125b is rotatable about the second axle 120b and the measurement-axle axis $X_m$ of the measurement axle assembly 110. Alternatively, the first and second wheels 125a, 125b can be rotatable about different axes (e.g., different parallel axes). The first wheel 125a includes a flange 126a for engaging and loading a first rail of a pair of generally parallel rails during a measurement operation/session. Similarly, the second wheel 125b includes a flange 126b for engaging and loading a second rail of the pair of generally parallel rails during the measurement operation/session.

The body 111 of the measurement axle assembly 110 includes a first portion of a plurality of guide rails 112a, a second portion of a plurality of guide rails 112b, a first spindle block 114a, and a second spindle block 114b. The first spindle block 114a is fixed to the first portion of the plurality of guide rails 112a and slidable, along the measurement-axle axis $X_m$, relative to the second portion of the plurality of guide rails 112b (e.g., via one or more bearings engaged with the second portion of the plurality of guide rails 112b). Similarly, the second spindle block 114b is fixed to the second portion of the plurality of guide rails 112b and slidable, along the measurement-axle axis $X_m$, relative to the first portion of the plurality of guide rails 112a (e.g., via one or more bearings engaged with the second portion of the plurality of guide rails 112b).

The first axle 120a extends from the body 111 in a first direction (arrow A) along the measurement-axle axis $X_m$ and the second axle 120b extends from the body 111 in an opposing second direction (arrow B) along the measurement-axle axis $X_m$. Further, the first axle 120a is fixed to the first spindle block 114a such that linear movement of the first spindle block 114a along the measurement-axle axis $X_m$ results in a corresponding linear movement of the first axle 120a. Similarly, the second axle 120b is fixed to the second spindle block 114b such that linear movement of the second spindle block 114b along the measurement-axle axis $X_m$ results in a corresponding linear movement of the second axle 120b.

The measurement axle assembly 110 also includes a lateral load cylinder 127 (best shown in FIGS. 11A and 11B) that is positioned between the first and the second spindle blocks 114a, 114b. The lateral load cylinder 127 is coupled to the first and the second spindle blocks 114a, 1114b such that the lateral load cylinder 127 can urge the first and the second spindle blocks 114a, 114b in opposite directions along the measurement-axle axis $X_m$. Specifically, an extension or elongation of the lateral load cylinder 127 causes the lateral load cylinder 127 to urge the first spindle block 114a in the first direction (in the direction of arrow A), which causes the first axle 120a and the first wheel 125a coupled thereto to move laterally along the measurement-axle axis $X_m$ in the first direction (in the direction of arrow A). Similarly, the extension or elongation of the lateral load cylinder 127 causes the lateral load cylinder 127 to urge the second spindle block 114b in the second direction (in the direction of arrow B), which causes the second axle 120b and the second wheel 125b coupled thereto to move laterally along the measurement-axle axis $X_m$ in the second direction (in the direction of arrow B). As such, when the DGRMS 100 is deployed in the operational position (FIG. 2) on a railroad track having two generally parallel rails, the extension or elongation of the lateral load cylinder 127 causes (i) the flange 126a of the first wheel 125a to laterally load a first of the rails in the first direction (in the direction of arrow A) and (ii) the flange 126b of the second wheel 125b to laterally load a second of the rails in the second direction (in the direction of arrow B). In some implementations, during extension and elongation of the lateral load cylinder 127, the vertical load cylinders 150a and 150b can simultaneously load the first and the second swing arms 160a, 160b in such a fashion as to apply downward loads to the wheels 125a and 125b, which aids in preventing the flanges 126a and 126b from overriding the heads of the rails.

The measurement axle assembly 110 also includes a first mounting block 116a coupled to the first spindle block 114a via a first bracket 118a and a second mounting block 116b coupled to the second spindle block 114b via a second bracket 118b. The first and the second mounting blocks 116a, 116b can be used for mounting one or more items to the measurement axle assembly 110. For example, as shown, in FIGS. 4A and 4B, a first lube stick assembly 128a is mounted to the first mounting block 116a and a second lube stick assembly 128b is mounted to the second mounting block 116b. The first lube stick assembly 128a is generally for applying lubrication to the first wheel 125a as needed during operation (best shown in FIG. 2). The second lube stick assembly 128b is likewise generally for applying lubrication to the second wheel 125b as needed during operation (best shown in FIG. 2).

In addition to providing a mount for the first and the second lube stick assemblies 128a, 128b, the first mounting block 116a also provides a mount for pivotally connecting the anti-rotation arm 190 to the measurement axle assembly 110. More specifically, an outer portion of the first mounting block 116a forms a clevis 117 such that a pin 117a can pivotally couple the anti-rotation arm 190 to the first mounting block 116a via the clevis 117. It is contemplated that the anti-rotation arm 190 can be coupled to various other parts or elements of the measurement axle assembly 110 such that the anti-rotation arm 190 aids in and/or prevents rotation of the body 111 about the measurement-axle axis $X_m$. While the DGRMS 100 only includes a single anti-rotation arm 190, in some alternative implementations, the DGRMS 100 can have any number of anti-rotation arms (e.g., two, three, etc.). The first and the second brackets 118a, 118b can also provide mounting points for one or more bump-stops 119a, 119b to be attached for aiding in preventing the measurement axle assembly 110 from contacting the frame 20 of the vehicle 10 when, for example, the measurement axle assembly 110 is raised to the stored/retracted position (FIGS. 1 and 12B).

Figure 5:
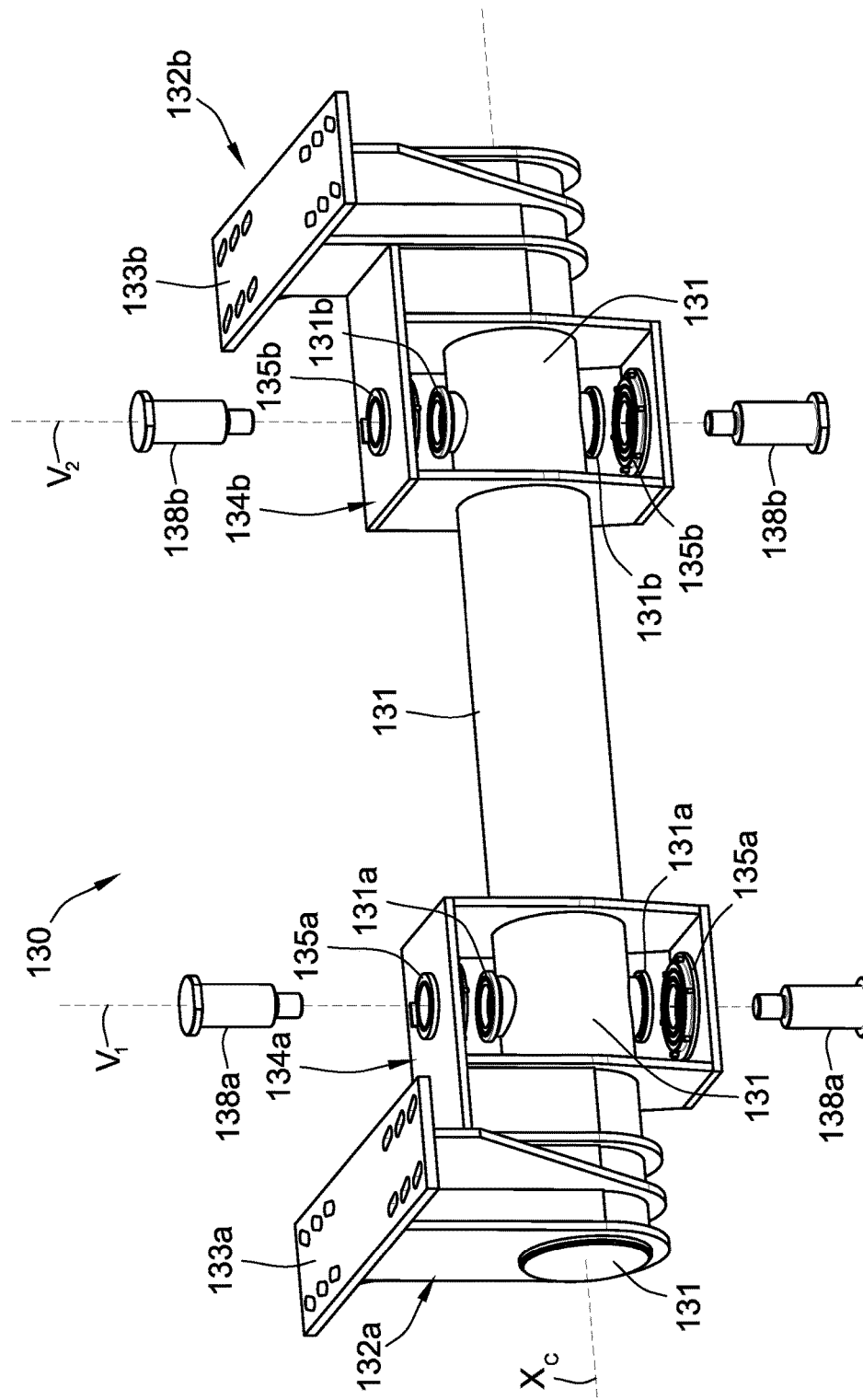
FIG. 5 is a perspective view of a cross member of the deployable gage restraint measurement system of FIG. 1.

Referring to FIG. 5, the cross member 130 includes a central body 131, first and second mounting assemblies 132a, 132b, and first and second frame-support mounts 134a, 134b. The central body 131 of the cross member 130 has a central axis Xc that is generally parallel with the underside of the body 20 of the hi-rail vehicle 10 and generally perpendicular to the rails of the track upon which the DGRMS 100 is deployed. The central body 131 is generally a hollow tube with a generally circular cross-section, although the central body 131 can have any shaped cross-section (e.g., square, oval, rectangle, triangle, polygonal, etc. or any combination thereof) and can be solid, hollow, or a combination thereof. The central body 131 provides a surface to which (i) the first and second mounting assemblies 132a, 132b, (ii) the first and second frame-support mounts 134a, 134b, and (iii) the self-centering assembly 200 are attached (shown in FIG. 10, not in FIG. 5).

The first and the second frame-support mounts 134a, 134b are attached to the central body 131 and/or attached about opposing ends of the central body 131. The first frame-support mount 134a includes apertures 135a that align with a first pair of apertures 131a in the central body 131. Similarly, the second frame-support mount 134b includes apertures 135b that align with a second pair of apertures 131b in the central body 131. As such, when the first support frame 140a is pivotally coupled to the cross member 130 via the first frame-support mount 134a, for example, via one or more pins 138a, the first support frame 140a is pivotal about a first vertical axis $V_1$ that is positioned through the center of the apertures 135a and the a first pair of apertures 131a. Similarly, when the second support frame 140b is pivotally coupled to the cross member 130 via the second frame-support mount 134b, for example, via one or more pins 138b, the second support frame 140b is pivotal about a second vertical axis $V_2$ that is positioned through the center of the apertures 135b and the a second pair of apertures 131b. The second vertical axis $V_2$ is spaced from and generally parallel to the first vertical axis $V_1$.

The first and the second mounting assemblies 132a, 132b are also attached to the central body 131 and/or attached about opposing ends of the central body 131. As shown, the first and the second frame-support mounts 134a, 134b are attached to the central body 131 between or inside of the first and the second mounting assemblies 132a, 132b. Alternatively, the relative positioning of the first and the second mounting assemblies 132a, 132b and the first and the second frame-support mounts 134a, 134b can be reversed such that the first and the second mounting assemblies 132a, 132b are attached to the central body 131 between or inside of the first and the second frame-support mounts 134a, 134b (not shown). The first mounting assembly 132a includes a first mounting plate 133a and the second mounting assembly 132b includes a second mounting plate 133b. The first and the second mounting plates 133a, 133b are for attaching the cross member 130 to the underside of the frame 20 of the vehicle 10 (FIG. 1) by, for example, nuts and bolts, welding, rivets, glue, screws, nails, any other type of fastener, or any combination thereof.

Referring to FIGS. 6A and 6B, the first support frame 140a includes a body 141 formed by a multitude of parts (e.g., plates, screws, welds, bolts, nuts, discs, etc.) having a generally outside surface 141a (FIG. 6A) and a generally inside surface 141b (FIG. 6B).

The first support frame 140a further includes first and second bearings 142a, 142b attached to the body 141. The first support frame 140a is coupled to the cross member 130 by (i) positioning the first bearing 142a between an upper portion of the first frame-support mount 134a and an upper portion of the central body 131 such that a central axis $X_{b1}$ of the first bearing 142a generally aligns with the first vertical axis $V_1$ (FIG. 5) and (ii) positioning the second bearing 142b between a lower portion of the first frame-support mount 134a and a lower portion of the central body 131 such that a central axis $X_{b2}$ of the second bearing 142b generally aligns with the first vertical axis $V_1$ (FIG. 5). With the first and the second bearings 142a, 142b so positioned, the pins 138a can be positioned through the apertures 135a and the apertures 131a such that the first support frame 140a is pivotally coupled to the first frame-support mount 134a of the cross member 130 via the pins 138a. The bearings 142a and 142b can be any type of suitable bearing, such as, for example, spherical bearings, cylindrical roller bearings, plain bearings, etc.

Once the first support frame 140a is pivotally coupled to the first frame-support mount 134a of the cross member 130 via the pins 138a, the first support frame 140a can only rotate about the first vertical axis $V_1$. That is, the first support frame 140a cannot tilt relative to, or with respect to, the first vertical axis $V_1$ and/or the cross member 130. As such, the first support frame 140a differs from the heavier prior deployable gage restraint measurement systems where the prior support frame was attached to a trunnion such that the prior support frame could tilt and indeed needed the ability to tilt to operate properly.

The body 141 of the first support frame 140a includes and/or forms a pair of first apertures 144a, 144b that receive a first support-frame pin 145 therein. The apertures 144a, 144b define a first support-frame axis $X_{sf1}$. The first support-frame pin 145, when coupled to the first support frame 140a via the pair of first apertures 144a, 144b, pivotally couples the first vertical load cylinder 150a to the first support frame 140a such that the first vertical load cylinder 150a is able to rotate and pivot about the first support-frame pin 145 and the first support-frame axis $X_{sf1}$ during, for example, operation of the first vertical load cylinder 150a (e.g., when the first vertical load cylinder 150a extends or contracts/retracts).

The body 141 of the first support frame 140a includes and/or forms a pair of second apertures 146a, 146b that receive a second support-frame pin 147 therein. The apertures 146a, 146b define a second support-frame axis $X_{sf2}$. The second support-frame pin 147, when coupled to the first support frame 140a via the pair of second apertures 146a, 146b, pivotally couples the first swing arm 160a to the first support frame 140a such that the first swing arm 160a is able to rotate and pivot about the second support-frame pin 147 and the second support-frame axis $X_{sf2}$ during, for example, operation of the first vertical load cylinder 150a (e.g., when the first vertical load cylinder 150a extends or contracts/retracts).

The first support frame 140a also includes a clevis 148 that is attached to a generally horizontal plate portion of the body 141 of the first support frame 140a. The clevis 148 can be attached to or integral with the generally horizontal plate portion of the body 141. In some implementations, the clevis 148 is welded to the generally horizontal plate portion of the body 141. The clevis 148 provides a mount for pivotally coupling the anti-rotation arm 190 to the first support frame 140a via a pin 148a as best shown in FIG. 2.

The first support frame 140a also includes a bearing plate 149 attached to the generally inside surface 141b (FIG. 6B) of the body 141 of the first support frame 140a. The bearing plate 149 provides a surface that is directly engaged by a roller of the self-centering assembly 200 during deployment of the measurement axle 110 onto a track as described further below in reference to FIG. 10. Alternatively to the first support frame 140a including the bearing plate 149, the first support frame 140a can lack the bearing plate 149 such that the self-centering assembly 200 just directly engages the generally inside surface 141b (FIG. 6B) of the body 141 of the first support frame 140a.

The first support frame 140a is described herein as being coupled with pins 138a, 145, and 147. It is understood that any of these pins 138a, 145, 147 can be a standard mounting pin and/or a force sensing pin (e.g., a force sensing clevis pin).

While the second support frame 140b is not shown in FIGS. 6A and 6B, the second support frame 140b is essentially the same as the first support frame 140a (e.g., a mirror image), except that the second support frame 140b mainly differs in that the second support frame 140b does not include a clevis (e.g., clevis 148) for mounting an anti-rotation arm thereto. As such, like reference numbers are used in the drawings for like parts of the second support frame 140b (e.g., FIGS. 2, 3, etc.). Alternatively, the second support frame 140b can include a clevis (not shown) for mounting a second anti-rotation arm (not shown) thereto.

Figure 7:
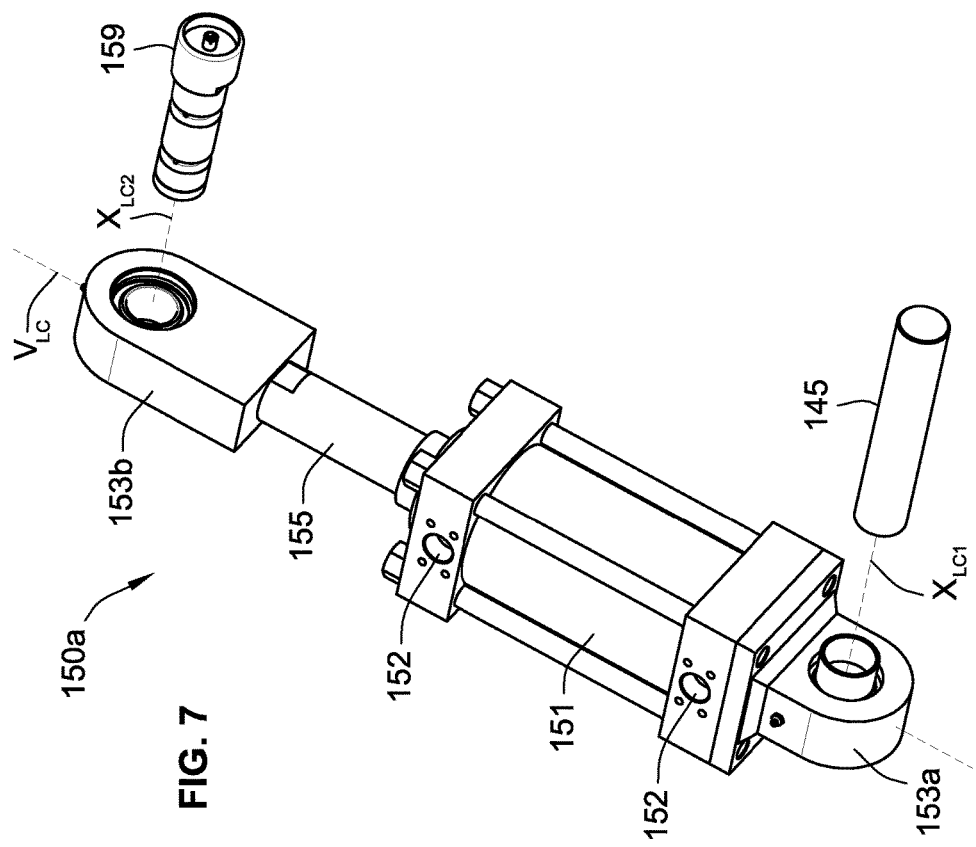
FIG. 7 is a perspective view of a first vertical load cylinder of the deployable gage restraint measurement system of FIG. 1.

Referring to FIG. 7, the first vertical load cylinder 150a includes a body 151 and a piston 155. The piston 155 is slidable relative to the body 151 along a vertical central axis $V_{LC}$ of the first vertical load cylinder 150a. The body 151 includes hydraulic fluid ports 152 that connect with tubes (not shown) for supplying and/or returning hydraulic fluid to a hydraulic fluid control system (not shown) for actuating the first vertical load cylinder 150a. By actuating the first vertical load cylinder 150a it is meant that the hydraulic fluid control system can selectively cause the piston 155 to extend, cause the piston 155 to retract, cause the piston 155 to hold its position, cause the piston 155 to move as required to changes in rail height as responded to by the wheels 125a and 125b while maintaining a relatively constant load (e.g., depending on opposing loads imparted by the rails of the track etc.), etc. In some implementations, the relatively constant force maintained during movement of the piston 155 is provided by a hydraulic accumulator. The hydraulic fluid control system can include any number of pumps, reservoirs, tubes, couplings, accumulators, etc.

The first vertical load cylinder 150a further includes a first rod end 153a extending from a lower or rearward portion of the body 151. The first rod end 153a forms an aperture therethrough having a central axis $X_{LC1}$. The first rod end 153a receives the first support-frame pin 145 therein such that the first vertical load cylinder 150a is able to rotate and pivot about (i) the first support-frame pin 145, (ii) the first support-frame axis $X_{sf1}$ (FIGS. 6A and 6B), and (iii) the central axis $X_{LC1}$ during, for example, operation of the first vertical load cylinder 150a (e.g., when the first vertical load cylinder 150a extends or contracts/retracts).

The first vertical load cylinder 150a further includes a second rod end 153b extending from an upper or forward portion of the piston 155. The second rod end 153b forms an aperture therethrough having a central axis $X_{LC2}$. The second rod end 153b receives a swing-arm pin 159 therein. The swing-arm pin 159, when coupled to the first swing-arm 160a, pivotally couples the first vertical load cylinder 150a via the second rod end 153b to the first swing arm 160a such that the first vertical load cylinder 150a is able to rotate and pivot about (i) the first swing-arm pin 159, (ii) a first swing-arm axis $X_{sa1}$ (FIGS. 8A and 8B), and (iii) the central axis $X_{LC2}$ during, for example, operation of the first vertical load cylinder 150a (e.g., when the first vertical load cylinder 150a extends or contracts/retracts).

The first vertical load cylinder 150a is described herein as being coupled with pins 145 and 159. It is understood that any of these pins 145 and 159 can be a standard mounting pin and/or a force sensing pin (e.g., a force sensing clevis pin).

While the second vertical load cylinder 150b is not shown in FIG. 7, the second vertical load cylinder 150b is the same as, or similar to, the first vertical load cylinder 150b (e.g., a mirror image)), except that the second vertical load cylinder 150b mainly differs in that the second vertical load cylinder 150b is coupled between the second support frame 140b (e.g., not the first support frame 140a) and the second swing arm 160b (e.g., not the first swing arm 160a). As such, like reference numbers are used in the drawings for like parts of the second vertical load cylinder 150b (e.g., FIGS. 2, 3, etc.).

As described herein, the first and second vertical load cylinders 150a, 150b are hydraulically powered. Alternatively, the first and second vertical load cylinders 150a, 150b can be powered by electricity, compressed air, steam, or any other source of power. While the first and second vertical load cylinders 150a, 150b are described as being "vertical," it is understood that the first and second vertical load cylinders 150a, 150b do not necessarily need to be vertical (e.g., the vertical central axes $V_{LC}$ of the first and second vertical load cylinders 150a, 150b can be at any angle relative to vertical and/or horizontal). The first and second vertical load cylinders 150a, 150b can be actuated (e.g., extended or retracted) at the same time (synchronously) or at different times (asynchronously).

Figure 8B:
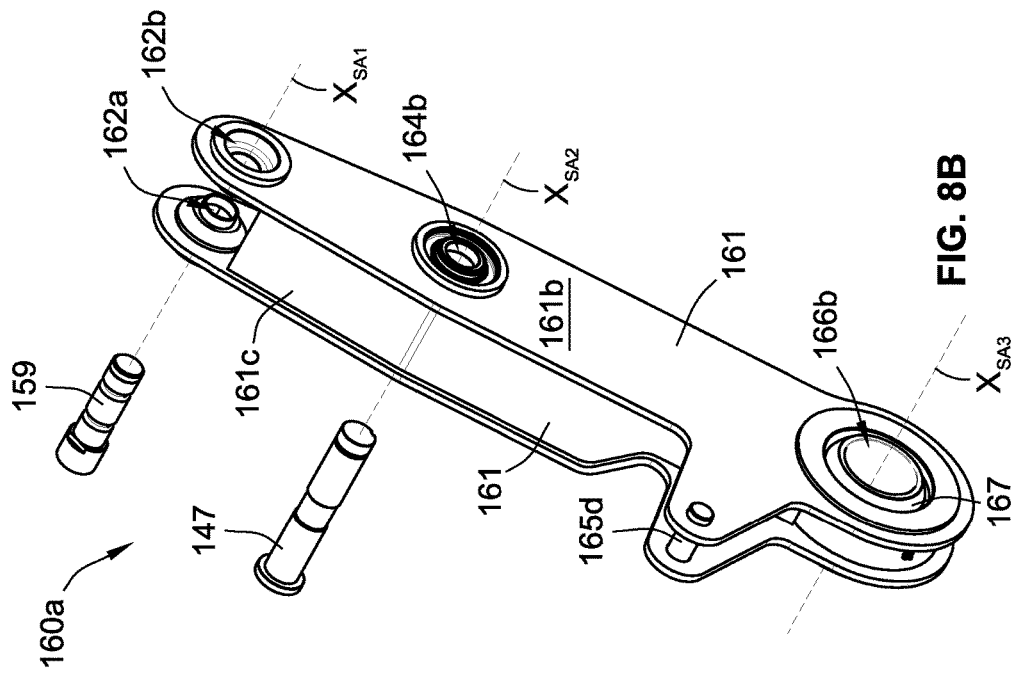
FIG. 8B is a second assembled perspective view of the first swing arm of the deployable gage restraint measurement system of FIG. 1.
Figure 8A:
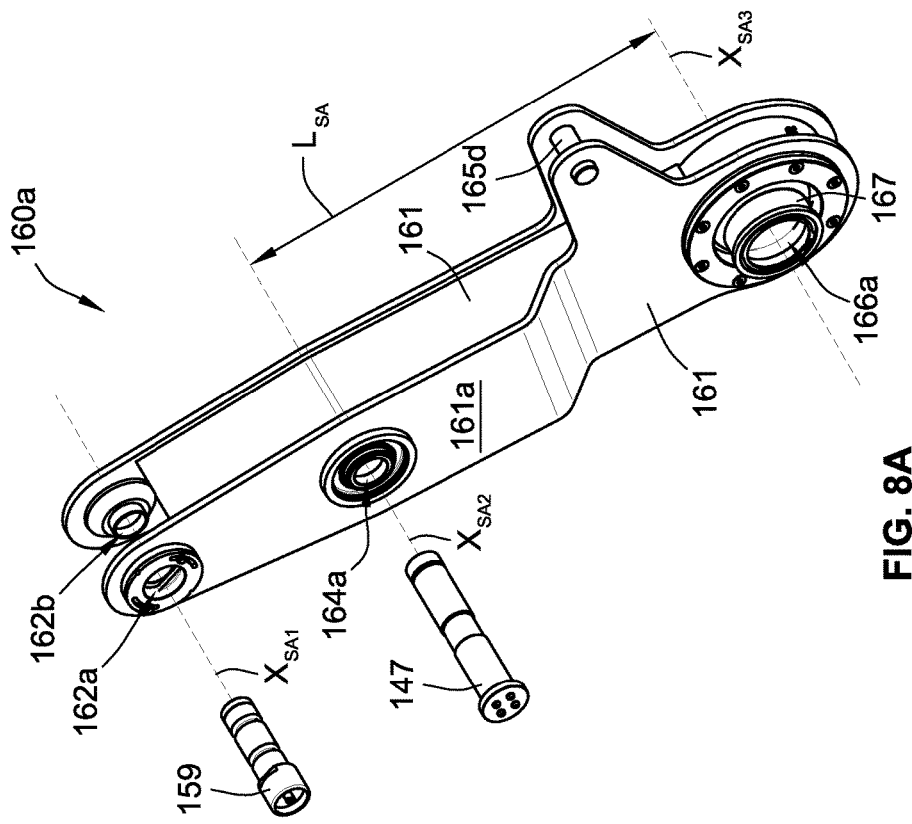
FIG. 8A is a first assembled perspective view of a first swing arm of the deployable gage restraint measurement system of FIG. 1.
Figure 8C:
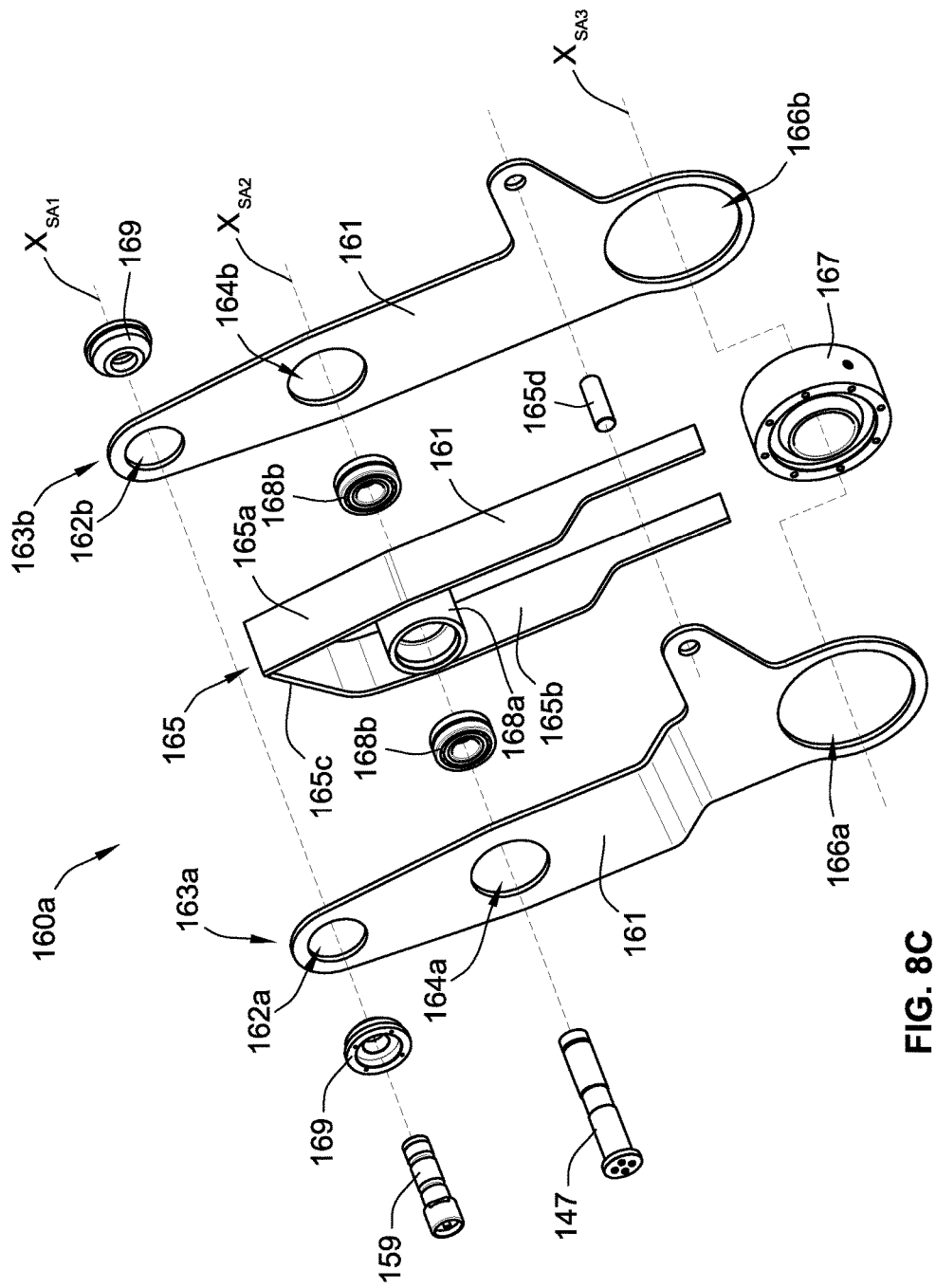
FIG. 8C is an exploded perspective view of the first swing arm of the deployable gage restraint measurement system of FIG. 1.

Referring to FIGS. 8A, 8B, and 8C, the first swing arm 160a includes a body 161 formed by a multitude of parts (e.g., plates, spacers, apertures, plugs, bearings, pins, screws, welds, bolts, nuts, discs, etc.) having a generally outside surface 161a (FIG. 8A) and a generally inside surface 161b (FIG. 8B). As best shown in the exploded view of FIG. 8C, the body 161 of the first swing arm 160a includes a first side plate 163a, a second side plate 163b, and a spacer 165. The spacer 165 is positioned between and fixed to the first and the second side plates 163a, 163b as shown in FIGS. 8A and 8B. As shown in FIG. 8C, the spacer 165 has an elongated "C" shape that is similar to a pair of tongs or tweezers. Specifically, the spacer 165 has an upper plate 165a, a lower plate 165b, and an end plate 165c that connects the upper and the lower plates 165a, 165b together. Positioned between the upper and the lower plates 165a, 165b is a tube 168a that receives bearings 168b in each of its ends. A laterally oriented latch pin 165d is included and coupled between the first and the second plates 163a, 163b and is used to engage a safety hook (e.g., extending from the underside of the frame 20 of the vehicle 10) for stowage of the DGRMS 100 when not in use. As such, the laterally oriented latch pin 165d allows the first swing arm 160a to be hung from the safety hook (not shown) attached to the frame 20 of the vehicle 10 in the stored/retracted position (FIGS. 1 and 12B) to aid in preventing the measurement axle assembly 110 from deploying prematurely (e.g., accidentally deploying). The first plate 163a forms therein a first aperture 162a, a second aperture 164a, and a third aperture 166a. Similarly, the second plate 163b forms therein a first aperture 162b, a second aperture 164b, and a third aperture 166b.

With the first and the second plates 163a, 163b attached via the spacer 165, the body 161 of the first swing arm 160a includes and/or forms a first pair of the apertures 162a, 162b that receive respective plugs 169 therein for receiving the swing-arm pin 159. The apertures 162a, 162b and/or the plugs 169 define the first swing-arm axis $X_{sa1}$, which is the central axis through the apertures 162a, 162b and/or the plugs 169. The swing-arm pin 159, when coupled to the first swing arm 160a via the plugs 169, pivotally couples the first vertical load cylinder 150a via the second coupler 153b to the first swing arm 160a such that the first vertical load cylinder 150a is able to rotate and pivot about the swing-arm pin 159 and the first swing-arm axis $X_{sa1}$ during, for example, operation of the first vertical load cylinder 150a (e.g., when the first vertical load cylinder 150a extends or contracts/retracts). The plugs 169 can simply include openings therethrough for receiving the swing-arm pin 159 and/or the plugs 169 can include one or more other structures coupled thereto or in lieu thereof (e.g., instead of the plugs 169), such as, for example, bearings (e.g., spherical bearings, cylindrical bearings, etc.), discs, plates, etc. The swing-arm pin 159 can be a load sensing pin used to measure the load imparted from the first vertical load cylinder 150a into the first swing arm 160a.

With the first and the second plates 163a, 163b attached via the spacer 165, the body 161 of the first swing arm 160a includes and/or forms a second pair of the apertures 164a, 164b that receive respective ones of the bearings 168b therein for receiving the second support-frame pin 147. The apertures 164a, 164b and/or the bearings 168b define the second swing-arm axis $X_{sa2}$, which is the central axis through the apertures 164a, 164b and/or the bearings 168b and/or the tube 168a. The second support-frame pin 147, when coupled to the first support frame 140a (FIGS. 6A and 6B) through (i) the apertures 164a, 164b, (ii) the bearings 168b and (iii) the tube 168a of the first swing arm 160a, pivotally couples the first swing arm 160a to the first support frame 140a such that the first swing arm 160a is able to rotate and pivot about the second support-frame pin 147 and the second swing-arm axis $X_{sa2}$ during, for example, operation of the first vertical load cylinder 150a (e.g., when the first vertical load cylinder 150a extends or contracts/retracts). The bearings 168b and/or the tube 168a can simply provide an opening through the body 161 and/or the bearings 168b and/or the tube 168a can include one or more other structures coupled thereto or in lieu thereof (e.g., instead of the bearings 168b, tube 168a), such as, for example, plugs (e.g., not a bearing), discs, plates, etc.

With the first and the second plates 163a, 163b attached via the spacer 165, the body 161 of the first swing arm 160a includes and/or forms a third pair of the apertures 166a, 166b that at least partially receive therethrough a spherical bearing 167. The spherical bearing 167 can be attached and/or fixed to the spacer 165. The spherical bearing 167 is positioned to receive the first axle 120a therethrough when the first swing arm 160a is coupled to the measurement axle assembly 110 as shown in, for example, FIG. 2. The apertures 166a, 166b and/or the spherical bearing 167 define a third swing-arm axis $X_{sa3}$, which is the central axis through the apertures 166a, 166b and/or through the spherical bearing 167. The first axle 120a (FIGS. 4A and 4B) extends through the spherical bearing 167 and pivotally couples the measurement axle assembly 110 to the first swing arm 160a such that the measurement axle assembly 110 is able to rotate and pivot with respect to the first swing arm 160a and about the third swing-arm axis $X_{sa3}$ during, for example, operation of the first vertical load cylinder 150a (e.g., when the first vertical load cylinder 150a extends or contracts/retracts). The apertures 166a, 166b can simply be openings in the body 161 and/or include one or more other structures coupled thereto, such as, for example, discs, plates, spacers, etc.

While the second swing arm 160b is not shown in FIGS. 8A, 8B, and 8C, the second swing arm 160b is the same as, or similar to, the first swing arm 160a (e.g., a mirror image), except that the second swing arm 160b mainly differs in that the second swing arm 160b generally couples the second support frame 140b (e.g., not the first support frame 140a) to the measurement axle assembly 110 via the second axle 120b (e.g., not via the first axle 120a). As such, like reference numbers are used in the drawings for like parts of the second swing arm 160b (e.g., FIGS. 2, 3, etc.).

As described herein, the first and second swing arms 160a, 160b couple the first and the second support frames 140a, 140b to the measurement axle 110 via the first and the second axles 120a, 120b, respectively. Specifically, the first swing arm 160a is a single mechanical linkage that couples the first support frame 140a to the measurement axle 110 via the first axle 120a and the second swing arm 160b is a single mechanical linkage that couples the second support frame 140b to the measurement axle 110 via the second axle 120b. As such, the DGRMS 100 of the present disclosure does not use two separate and distinct linkages (e.g., an upper swing arm and a lower swing arm) to couple each of the support frames 140a, 140b to each end of the measurement axle assembly 110 like some prior systems. As such, the DGRMS 100 of the present disclosure uses less parts, is relatively lighter, and is less complicated mechanically to install and/or service. However, as such a coupling of the measurement axle assembly 110 could allow the measurement axle assembly 110 to rotate about the measurement-axle axis $X_m$, the anti-rotation arm 190 is provided as described in reference to FIG. 9 and elsewhere herein.

Figure 9:
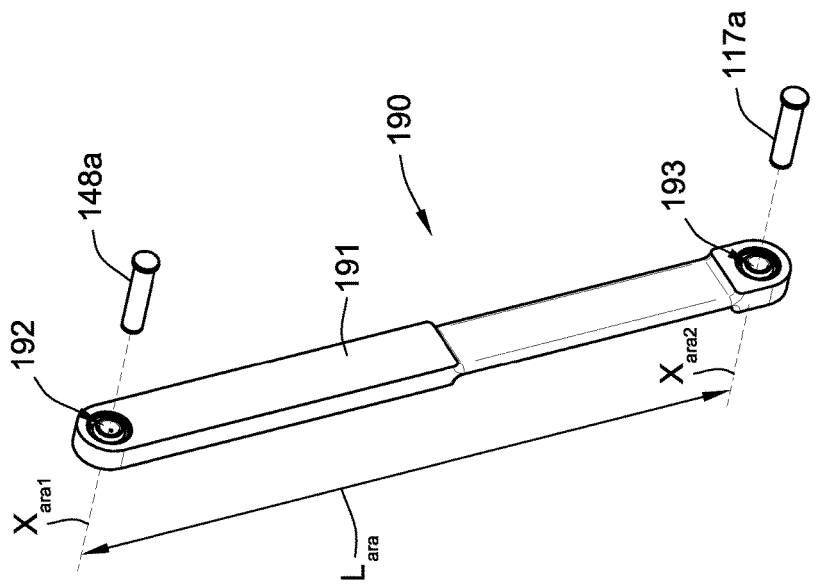
FIG. 9 is a perspective view of an anti-rotation arm of the deployable gage restraint measurement system of FIG. 1.

Referring to FIG. 9, the anti-rotation arm 190 includes an elongated body 191 having a first aperture 192 and a second aperture 193 therethrough. The first aperture 192 has a central axis $X_{ara1}$ and the second aperture 193 has a central axis $X_{ara2}$. The first aperture 192 receives the pin 148a (FIGS. 6A and 6B) therein such that the anti-rotation arm 190 is able to rotate and pivot about the pin 148a and the central axis $X_{ara1}$ during, for example, operation of the first vertical load cylinder 150a (e.g., when the first vertical load cylinder 150a extends or contracts/retracts). Similarly, the second aperture 193 receives the pin 117a (FIGS. 4A and 4B) therein such that the anti-rotation arm 190 is able to rotate and pivot about the pin 117a and the central axis $X_{ara2}$ during, for example, operation of the first vertical load cylinder 150a (e.g., when the first vertical load cylinder 150a extends or contracts/retracts). While the anti-rotation arm 190 is shown as having a certain shape and cross-section, the anti-rotation arm 190 can have any shape and any cross-section or combination of shapes and cross-sections (e.g., a circular cross-section, a tubular cross-section, an oval cross-section, a square cross-section, a polygonal cross-section, etc.).

The anti-rotation arm 190 has a length $L_{ara}$ measured between the central axis $X_{ara1}$ of the first aperture 192 and the central axis $X_{ara2}$ of the second aperture 193 that is the same as, or substantially the same as, a length $L_{sa}$ (FIGS. 8A and 8B) of the first swing arm 160a between the second swing-arm axis $X_{sa2}$ and the third swing-arm axis $X_{sa3}$. As such, during, for example, operation of the first and the second vertical load cylinders 150a, 150b (e.g., when the first and the second vertical load cylinders 150a, 150b extend or contract/retract), the anti-rotation arm 190 and the first swing arm 160a remain generally parallel to each other.

Figure 10B:
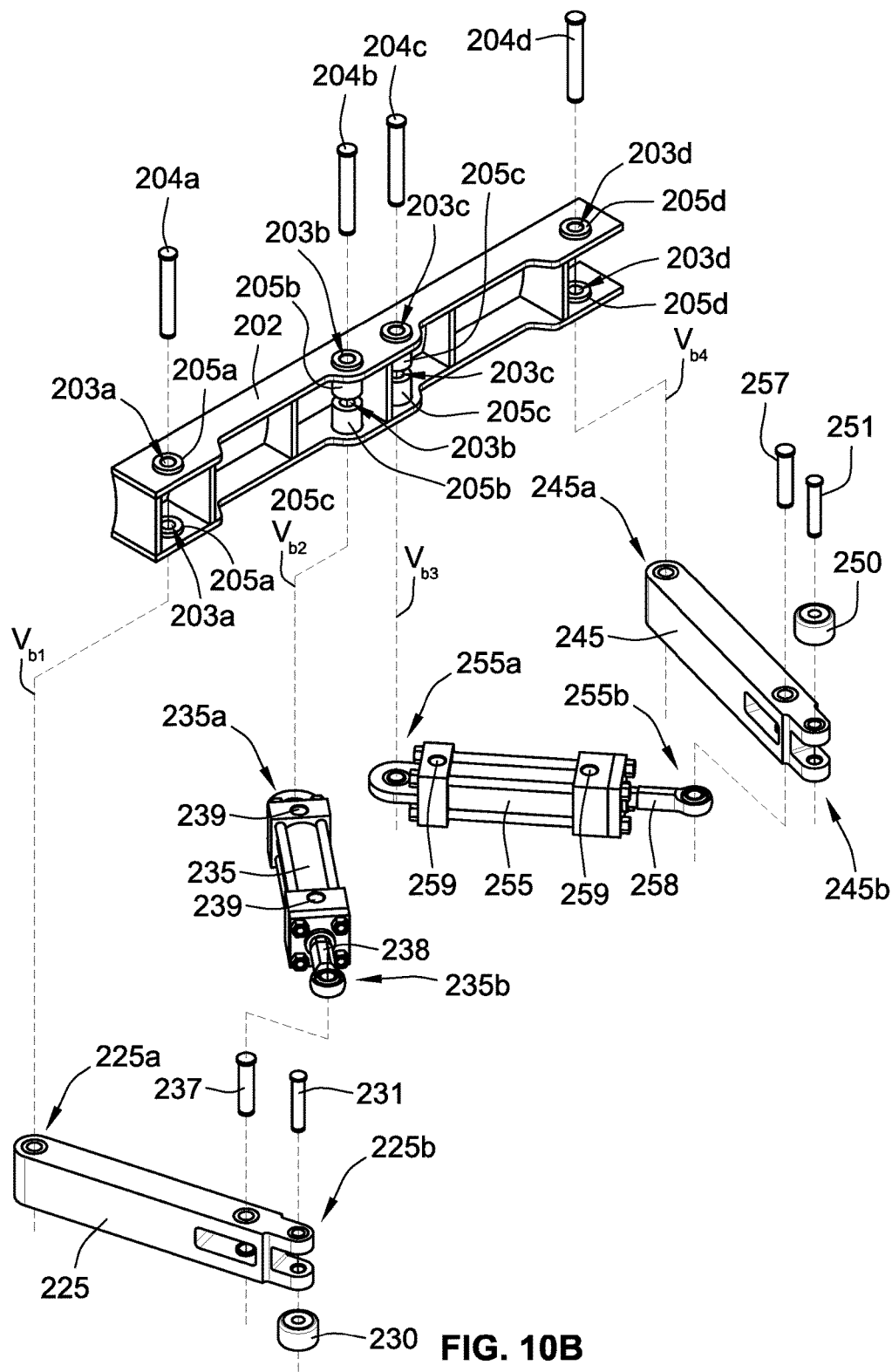
FIG. 10B is an exploded perspective view of the self-centering assembly of the deployable gage restraint measurement system of FIG. 1.

Referring to FIGS. 10A and 10B, the self-centering assembly 200 includes a base 202, a first self-centering sub-assembly 220, and a second self-centering sub-assembly 240. The base 202 is attached to the central body 131 of the cross member 130. The base 202 includes four pairs of apertures 203a, 203b, 203c, and 203d (FIG. 10B) that define four base axes $V_{b1}$, $V_{b2}$, $V_{b3}$, and $V_{b4}$. Each of the pairs of apertures 203a, 203b, 203c, and 203d is coupled to a respective pin 204a, 204b, 204c, and 204d. In some implementations, each of the apertures 203a, 203b, 203c, and 203d includes a plug or spacer mounted thereto for receiving the respective pins 204a, 204b, 204c, and 204d. As shown in FIG. 10B, each of the first pair of apertures 203a includes a respective plug or spacer 205a therein. Similarly, each of the second pair of apertures 203b includes a respective plug or spacer 205b therein; each of the third pair of apertures 203c includes a respective plug or spacer 205c therein; and each of the fourth pair of apertures 203d includes a respective plug or spacer 205d therein.

The first self-centering sub-assembly 220 is coupled to the base 202. The first self-centering sub-assembly 220 includes a first centering arm 225 and a first centering cylinder 235. A first end 225a of the first centering arm 225 is pivotally coupled to the base 202 via a first one of the pins 204a. A second opposing end 225b of the first centering arm 225 includes a first cam roller 230 attached to the second opposing end 225b via a pin 231. The first cam roller 230 is positioned to engage the bearing plate 149 attached to the generally inside surface 141b (FIG. 6B) of the body 141 of the first support frame 140a when, for example, the first centering cylinder 235 is actuated.

A first end 235a of the first centering cylinder 235 is pivotally coupled to the base 202 via a second one of the pins 204b. A second opposing end 235b of the first centering cylinder 235 is pivotally coupled to the first centering arm 225 via a pin 237. Specifically, the first centering cylinder 235 is pivotally coupled to the first centering arm 225 at a portion of the first centering arm 225 between the first end 225a and the opposing second end 225b such that the first centering arm 225 is able to rotate and pivot about the first pin 204a and the first base axis $V_{b1}$ during, for example, operation of the first centering cylinder 235 (e.g., when the first centering cylinder 235 extends or contracts/retracts).

Similarly to the first self-centering sub-assembly 220, the second self-centering sub-assembly 240 is coupled to the base 202. The second self-centering sub-assembly 240 includes a second centering arm 245 and a second centering cylinder 255. A first end 245a of the second centering arm 245 is pivotally coupled to the base 202 via a fourth one of the pins 204d. A second opposing end 245b of the second centering arm 245 includes a second cam roller 250 attached to the second opposing end 245b via a pin 251. The second cam roller 250 is positioned to engage the bearing plate 149 (FIGS. 2 and 11A) attached to the generally inside surface of the body of the second support frame 140b when, for example, the second centering cylinder 255 is actuated.

A first end 255a of the second centering cylinder 255 is pivotally coupled to the base 202 via a third one of the pins 204c. A second opposing end 255b of the second centering cylinder 255 is pivotally coupled to the second centering arm 245 via a pin 257. Specifically, the second centering cylinder 255 is pivotally coupled to the second centering arm 245 at a portion of the second centering arm 245 between the first end 245a and the opposing second end 245b such that the second centering arm 245 is able to rotate and pivot about the fourth pin 204d and the fourth base axis $V_{b4}$ during, for example, operation of the second centering cylinder 255 (e.g., when the second centering cylinder 255 extends or contracts/retracts).

As best shown in FIG. 10B, when attaching the first and the second self-centering sub-assemblies 220, 240, the first end 225a of the first centering arm 225 is positioned between the plugs 205a and pivotally coupled to the base 202 via the first one of the pins 204a. The first end 235a of the first centering cylinder 235 is positioned between the plugs 205b and pivotally coupled to the base 202 via the second one of the pins 204b. The first end 245a of the second centering arm 245 is positioned between the plugs 205d and pivotally coupled to the base 202 via the fourth one of the pins 204d. The first end 255a of the second centering cylinder 255 is positioned between the plugs 205c and pivotally coupled to the base 202 via the third one of the pins 204c. As shown in FIG. 10B, the plugs 205a, 205b, 205c, and 205d have certain heights/thicknesses corresponding to the thicknesses of the first ends of the components coupled thereto; however, it is contemplated that the plugs 205a, 205b, 205c, and 205d can have any height/thickness.

As shown in FIGS. 10A and 10B, the first centering cylinder 235 includes hydraulic fluid ports 239 and the second centering cylinder 255 includes hydraulic fluid ports 259 that connect with tubes (not shown) for supplying and/or returning hydraulic fluid to a hydraulic fluid control system (not shown) for actuating the first and the second centering cylinders 235, 255. By actuating the first and the second centering cylinders 235, 255 it is meant that the hydraulic fluid control system can selectively cause a piston 238 of the first centering cylinder 235 and/or a piston 258 of the second centering cylinder 255 to extend, cause the pistons 238, 258 to retract, cause the pistons 238, 258 to hold its position, etc. The hydraulic fluid control system can be the same hydraulic fluid control system described above in connection with the operation of the vertical load cylinders 150a, 150b, or the hydraulic fluid control system can be a different independent system that includes any number of pumps, reservoirs, tubes, couplings, accumulators, etc.

Referring to FIG. 11A, a top view of the DGRMS 100 is shown with the self-centering assembly 200 in a first retracted (e.g., disengaged) position. As such, the pistons 238, 258 are generally retracted such that the first and the second cam rollers 230, 250 are not engaged with the respective bearing plates 149 on the respective inside surfaces of the first and the second support frames 140a, 140b.

Referring to FIG. 11B, a top view of the DGRMS 100 is shown with the self-centering assembly 200 in a second extended (e.g., engaged) position. As such, the pistons 238, 258 are generally extended such that the first and the second cam rollers 230, 250 engage the respective bearing plates 149 on the respective inside surfaces of the first and the second support frames 140a, 140b. According to some implementations, with the self-centering assembly 200 in the second extended (e.g., engaged) position (FIG. 11B), the measurement axle assembly 110 can be deployed (e.g., by operation of the first and the second vertical load cylinders 150a, 150b) on a track having cross level, as the engagement of the roller bearings 230, 250 aids in preventing (or prevents) the first and the second support frames 140a, 140b from rotating about the first vertical axis $V_1$ (FIG. 2) and the second vertical axis $V_2$ (FIG. 2), respectively.

Referring to FIG. 12A, the DGRMS 100 of the present disclosure is shown in the deployed/operational position such that the wheels 125a, 125b (only wheel 125a is shown) of the measurement axle assembly 110 contact and/or load a track T having generally parallel rails $R_1$ and $R_2$ (only a first rail $R_1$ is shown). The measurement axle assembly 110 can be retracted from the deployed or operational position (FIGS. 2 and 12A) to a stored/retracted position (FIGS. 1 and 12B). As shown in FIG. 12B, once the measurement axle assembly 110 is retracted and/or stored, the wheels 125a, 125b no longer engage and/or load the rails $R_1$ and $R_2$ (only the first rail $R_1$ is shown) of the track T.

During operation of the DGRMS 100, the first and the second swing arms 160a, 160b pivot and/or otherwise move with respect to various other components of the DGRMS 100 and about several different axes. Generally, operation of the DGRMS 100 causes the first swing arm 160a to (i) pivot about a first axis relative to the first vertical load cylinder 150a, (ii) pivot about a second axis relative to the first support frame 140a, and (iii) pivot about a third axis relative to the first axle 120a. In some such implementations, the first axis is adjacent to a first end of the first swing arm 160a, the third axis is adjacent to an opposing second end of the first swing arm 160a, and the second axis is between the first axis and the third axis. Similarly, operation of the DGRMS 100 causes the second swing arm 160b to (i) pivot about a fourth axis relative to the second vertical load cylinder 150b, (ii) pivot about a fifth axis relative to the second support frame 140b, and (iii) pivot about a sixth axis relative to the second axle 120b. In some such implementations, the fourth axis is adjacent to a first end of the second swing arm 160b, the sixth axis is adjacent to an opposing second end of the second swing arm 160b, and the fifth axis is between the fourth axis and the sixth axis. The first and the second swing arms 160a, 160b can move independently from one another such that during operation of the DGRMS 100, the first axis and the fourth axis are not always or ever coincident; the second axis and the fifth axis are not always or ever coincident; and the third axis and the sixth axis are not always or ever coincident. In some alternative implementations, the first axis and the fourth axis are coincident; the second axis and the fifth axis are coincident; and the third axis and the sixth axis are coincident.

More specifically, in some implementations, when the DGRMS 100 moves from the stored position (FIG. 12B) to the deployed position (FIG. 12A), the first swing arm 160*a* pivots about the first swing-arm axis $X_{sa1}$ (FIGS. 8A-8C), which is coincident with the central axis $X_{LC2}$ of the second rod end 153*b* of the first vertical load cylinder 150*a* (FIG. 7) as the swing-arm pin 159 is positioned through the first pair of the apertures 162*a*, 162*b* (FIGS. 8A-8C) and/or the plugs 169 (FIG. 8C) of the first swing arm 160*a* and through the aperture of the second rod end 153*b* of the first vertical load cylinder 150*a* (FIG. 7). Further, the first swing arm 160*a* pivots about the second swing-arm axis $X_{sa2}$ (FIGS. 8A-8C), which is coincident with the second support-frame axis $X_{sf2}$ of the first support frame 140*a* (FIGS. 6A and 6B) as the second support-frame pin 147 is positioned through the pair of second apertures 146*a*, 146*b* (FIGS. 6A and 6B) of the first support frame 140*a* and through the apertures 164*a*, 164*b* (FIGS. 8A-8C) and/or the bearings 168*b* of the first swing arm 160*a*. Even further, the first swing arm 160*a* pivots about the third swing-arm axis $X_{sa3}$ (FIGS. 8A-8C), which is coincident with the measurement-axle axis $X_m$ (FIGS. 4A and 4B) as the first axle 120*a* is positioned through the spherical bearing 167.

A comparison of FIGS. 12A and 12B illustrates that the anti-rotation arm 190 remains parallel with the first swing arm 160*a* during, for example, operation of the first and the second vertical load cylinders 150*a*, 150*b* (e.g., when the first and the second vertical load cylinders 150*a*, 150*b* extend or contract/retract) between the extended/deployed position (FIG. 12A) and the retracted/stored position (FIG. 12B).

While the present disclosure has been described with reference to one or more particular embodiments and implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. A deployable gage restraint measurement system, comprising:
   a measurement axle assembly having a measurement-axle axis therethrough;
   a cross member;
   a support frame pivotally coupled to the cross member;
   a load cylinder pivotally coupled to the support frame;
   a swing arm pivotally coupled to (i) the load cylinder about a first axis of the swing arm, (ii) the support frame about a second axis of the swing arm, and (iii) the measurement axle assembly about a third axis of the swing arm;
   an anti-rotational arm pivotally coupled to (i) the support frame and (ii) the measurement axle assembly, the anti-rotation arm being configured to prevent rotation of a body of the measurement axle assembly about the measurement-axle axis; and
   a mounting block coupled to the body of the measurement axle assembly, the mounting block including a clevis and a pin for pivotally coupling the anti-rotation arm to the body of the measurement axle assembly.

2. The system of claim 1, wherein the second axis is between the first axis and the third axis.

3. A deployable gage restraint measurement system, comprising:
   a measurement axle assembly having a measurement-axle axis therethrough;
   a cross member;
   a support frame pivotally coupled to the cross member;
   a load cylinder pivotally coupled to the support frame;
   a swing arm pivotally coupled to (i) the load cylinder about a first axis of the swing arm, (ii) the support frame about a second axis of the swing arm, and (iii) the measurement axle assembly about a third axis of the swing arm, the swing arm being pivotally coupled to the support frame at a central portion of the swing arm; and
   an anti-rotational arm pivotally coupled to (i) the support frame and (ii) the measurement axle assembly.

4. The system of claim 3, wherein the anti-rotational arm and the swing arm are configured to remain generally parallel during deployment of the deployable gage restraint measurement system.

5. The system of claim 3, wherein the support frame is coupled to the cross member such that the support frame can only rotate about a vertical axis and cannot tilt relative to the vertical axis.

6. The system of claim 3, wherein an extension of the load cylinder causes the swing arm to pivot relative to the support frame in a first rotational direction to aid in deploying the measurement axle assembly and wherein a retraction of the load cylinder causes the swing arm to pivot relative to the support frame in an opposing second rotational direction to aid in storing the measurement axle assembly.

7. A deployable gage restraint measurement system of claim comprising:
   a measurement axle assembly having a measurement-axle axis therethrough;
   a cross member;
   a support frame pivotally coupled to the cross member;
   a load cylinder pivotally coupled to the support frame;
   a swing arm pivotally coupled to (i) the load cylinder about a first axis of the swing arm, (ii) the support frame about a second axis of the swing arm, and (iii) the measurement axle assembly about a third axis of the swing arm; and
   an anti-rotational arm pivotally coupled to (i) the support frame and (ii) the measurement axle assembly, a length of the anti-rotational arm being about equal to a distance between the second axis and the third axis.

8. The system of claim 7, wherein the anti-rotational arm and the swing arm are configured to remain generally parallel during deployment of the deployable gage restraint measurement system.

9. The system of claim 7, wherein the support frame is coupled to the cross member such that the support frame can only rotate about a vertical axis and cannot tilt relative to the vertical axis.

10. The system of claim 7, wherein an extension of the load cylinder causes the swing arm to pivot relative to the support frame in a first rotational direction to aid in deploying the measurement axle assembly and wherein a retraction of the load cylinder causes the swing arm to pivot relative to the support frame in an opposing second rotational direction to aid in storing the measurement axle assembly.

11. A deployable gage restraint measurement system, comprising;
a measurement axle assembly having a measurement-axle axis therethrough;
a cross member;
a support frame pivotally coupled to the cross member;
a load cylinder pivotally coupled to the support frame;
a swing arm pivotally coupled to (i) the load cylinder about a first axis of the swing arm, (ii) the support frame about a second axis of the swing arm, and (iii) the measurement axle assembly about a third axis of the swing arm;
an anti-rotational arm pivotally coupled to (i) the support frame and (ii) the measurement axle assembly; and
a self-centering assembly extending from the cross member and being configured to engage the support frame to aid in maintaining rotational position of the support frame during deployment of the measurement axle assembly on a track having cross level.

12. The system of claim 11, wherein the self-centering assembly includes:
a centering arm having (i) a first end pivotally coupled to the cross member and (ii) a second opposing end including a cam roller configured to engage the support frame; and
a centering cylinder having (i) a first end pivotally coupled to the cross member and (ii) a second opposing end pivotally coupled to the centering arm at a portion of the centering arm between the first end and the opposing second end of the centering arm.

13. The system of claim 12, wherein an extension of the centering cylinder causes the centering arm to pivot relative to the cross member such that the cam roller engages the support frame.

14. The system of claim 11, wherein the support frame is coupled to the cross member such that the support frame can only rotate about a vertical axis and cannot tilt relative to the vertical axis.

15. The system of claim 14, wherein the anti-rotational arm and the swing arm are configured to remain generally parallel during deployment of the deployable gage restraint measurement system.

16. The system of claim 15, wherein an extension of the load cylinder causes the swing arm to pivot relative to the support frame in a first rotational direction to aid in deploying the measurement axle assembly and wherein a retraction of the load cylinder causes the swing arm to pivot relative to the support frame in an opposing second rotational direction to aid in storing the measurement axle assembly.

17. A deployable gage restraint measurement system, comprising:
a cross member;
a first support frame pivotally coupled to the cross member;
a second support frame pivotally coupled to the cross member;
a measurement axle assembly coupled to the first and the second support frames; and
a self-centering assembly extending from the cross member and being configured to engage the first and the second support frames to aid in maintaining rotational positions of the first and the second support frames during deployment of the measurement axle assembly on a track having cross level.

18. The system of claim 17, further comprising:
a first swing arm pivotally coupled to (i) the first support frame and (ii) the measurement axle assembly; and
a second swing arm pivotally coupled to (i) the second support frame and (ii) the measurement axle assembly.

19. The system of claim 18, further comprising an anti-rotational arm pivotally coupled to (i) the first support frame and (ii) the measurement axle assembly, wherein the anti-rotation arm prevents rotation of a body of the measurement axle assembly.

20. A deployable gage restraint measurement system, comprising:
a measurement axle assembly including a body, a first axle extending from the body in a first direction, a second axle extending from the body in an opposing second direction, a first wheel coupled to the first axle such that the first wheel is rotatable about a measurement-axle axis, and a second wheel coupled to the second axle such that the second wheel is rotatable about the measurement-axle axis;
a cross member;
a first support frame coupled to the cross member such that the first support frame is rotatable about a first vertical axis;
a first vertical load cylinder having a first end and an opposing second end, the first end of the first load cylinder being pivotally coupled to the first support frame;
a first swing arm having a first end and an opposing second end, the first end of the first swing arm including a spherical bearing attached to the first axle, the opposing second end of the first swing arm being pivotally coupled to the opposing second end of the first vertical load cylinder, the first swing arm being pivotally coupled to the first support frame at a portion of the first swing arm between the first end and the opposing second end of the first swing arm; and
an anti-rotational arm pivotally coupled to the first support frame and pivotally coupled to the measurement axle assembly such that rotation of the body of the measurement axle assembly about the measurement-axle axis is prevented.

21. The system of claim 20, wherein the first swing arm is configured to (i) pivot about a first axis relative to the first vertical load cylinder, (ii) pivot about a second axis relative to the first support frame, and (iii) pivot about a third axis relative to the first axle, and wherein the first axis is adjacent to the first end of the first swing arm, the third axis is adjacent to the opposing second end of the first swing arm, and the second axis is between the first axis and the third axis.

22. The system of claim 21, wherein a length of the anti-rotational arm is about equal to a distance between the first axis and the second axis.

23. The system of claim 22, wherein the anti-rotational arm and the first swing arm are configured to remain generally parallel during deployment of the deployable gage restraint measurement system.

24. The system of claim 20, wherein the first support frame is coupled to the cross member such that the first support frame can only rotate about the first vertical axis and cannot tilt relative to the first vertical axis.

25. The system of claim 24, wherein the first support frame is directly attached to the cross member via one or more pins.

26. The system of claim 20, wherein the cross member is configured to couple the deployable gage restraint measurement system to a rail vehicle.

27. The system of claim 20, wherein the first end of the first swing arm is attached to the first axle between the first wheel and the body of the measurement axle assembly.

28. The system of claim 20, wherein an extension of the first vertical load cylinder causes the first swing arm to pivot relative to the first support frame in a first rotational direction to aid in deploying the measurement axle assembly and wherein a retraction of the first vertical load cylinder causes the first swing arm to pivot relative to the first support frame in an opposing second rotational direction to aid in storing the measurement axle assembly.

29. The system of claim 28, further comprising a second support frame coupled to the cross member such that the second support frame is rotatable about a second vertical axis spaced from the first vertical axis.

30. The system of claim 29, further comprising a second vertical load cylinder having a first end and an opposing second end, the first end of the second load cylinder being pivotally coupled to the second support frame.

31. The system of claim 30, further comprising a second swing arm having a first end and an opposing second end, the first end of the second swing arm including a spherical bearing attached to the second axle, the opposing second end of the second swing arm being pivotally coupled to the opposing second end of the second vertical load cylinder, the second swing arm being pivotally coupled to the second support frame at a portion of the second swing arm between the first end and the opposing second end of the second swing arm.

32. The system of claim 31, wherein the first end of the second swing arm is attached to the second axle between the second wheel and the body of the measurement axle assembly.

33. The system of claim 31, wherein an extension of the second vertical load cylinder causes the second swing arm to pivot relative to the second support frame in the first rotational direction to aid in deploying the measurement axle assembly and wherein a retraction of the second vertical load cylinder causes the second swing arm to pivot relative to the second support frame in the opposing second rotational direction to aid in storing the measurement axle assembly.

34. The system of claim 33, wherein the extension of the first vertical load cylinder and the extension of the second vertical load cylinder occur at the same time to deploy the measurement axle assembly and wherein the retraction of the first vertical load cylinder and the retraction of the second vertical load cylinder occur at the same time to store the measurement axle assembly.

35. The system of claim 29, further comprising a self-centering assembly configured to engage the first and the second support frames to aid in maintaining rotational positions of the first and the second support frames during deployment of the measurement axle assembly.

36. The system of claim 35, wherein the self-centering assembly aids in maintaining the rotational positions of the first and the second support frames during deployment of the measurement axle assembly on a track having cross level.

37. The system of claim 29, further comprising a self-centering assembly including a first self-centering sub-assembly having:

a first centering arm having (i) a first end pivotally coupled to the cross member and (ii) a second opposing end including a first cam roller configured to engage the first support frame; and
a first centering cylinder having (i) a first end pivotally coupled to the cross member and (ii) a second opposing end pivotally coupled to the first centering arm at a portion of the first centering arm between the first end and the opposing second end of the first centering arm.

38. The system of claim 37, wherein the self-centering assembly further includes a second self-centering sub-assembly having:

a second centering arm having (i) a first end pivotally coupled to the cross member and (ii) a second opposing end including a second cam roller configured to engage the second support frame; and
a second centering cylinder having (i) a first end pivotally coupled to the cross member and (ii) a second opposing end pivotally coupled to the second centering arm at a portion of the second centering arm between the first end and the opposing second end of the second centering arm.

39. The system of claim 38, wherein an extension of the first centering cylinder causes the first centering arm to pivot relative to the cross member such that the first cam roller engages the first support frame and wherein an extension of the second centering cylinder causes the second centering arm to pivot relative to the cross member such that the second cam roller engages the second support frame.

40. The system of claim 39, wherein the engagements of the first and the second cam rollers with the first and the second support frames aid in maintaining (i) a rotational position of the first support frame about the first vertical axis and (ii) a rotational position of the second support frame about the second vertical axis during deployment of the measurement axle assembly on a track having cross level.

41. The system of claim 20, further comprising a mounting block coupled to the body, the mounting block including a clevis and a pin for pivotally coupling the anti-rotation arm to the body of the measurement axle assembly.

42. The system of claim 20, wherein the body of the measurement axle assembly includes a plurality of guide rails, a first spindle block, and a second spindle block, the first spindle block being fixed to a first portion of the plurality of guide rails and slidable, along the measurement-axle axis, relative to a second portion of the plurality of guide rails, and the second spindle block being fixed to the second portion of the plurality of guide rails and slidable, along the measurement-axle axis, relative to the first portion of the plurality of guide rails.

43. A deployable gage restraint measurement system, comprising:

a measurement axle assembly including a body, a first axle extending from the body in a first direction, a second axle extending from the body in an opposing second direction, a first wheel coupled to the first axle such that the first wheel is rotatable about a measurement-axle axis, and a second wheel coupled to the second axle such that the second wheel is rotatable about the measurement-axle axis;
a cross member;
a first support frame coupled to the cross member such that the first support frame is rotatable about a first vertical axis;
a second support frame coupled to the cross member such that the second support frame is rotatable about a second vertical axis spaced from the first vertical axis;

a first vertical load cylinder having a first end and an opposing second end, the first end of the first load cylinder being pivotally coupled to the first support frame;

a first swing arm having a first end and an opposing second end, the first end of the first swing arm including a spherical bearing attached to the first axle, the opposing second end of the first swing arm being pivotally coupled to the opposing second end of the first vertical load cylinder, the first swing arm being pivotally coupled to the first support frame at a portion of the first swing arm between the first end and the opposing second end of the first swing arm; and a self-centering assembly coupled to the cross member, the self-centering assembly being configured to engage the first and the second support frames to aid in maintaining (i) a rotational position of the first support frame about the first vertical axis and (ii) a rotational position of the second support frame about the second vertical axis during deployment of the measurement axle assembly on a track having cross level.

44. The system of claim 43, wherein the self-centering assembly includes a first self-centering sub-assembly having:

a first centering arm having (i) a first end pivotally coupled to the cross member and (ii) a second opposing end including a first cam roller configured to engage the first support frame; and a first centering cylinder having (i) a first end pivotally coupled to the cross member and (ii) a second opposing end pivotally coupled to the first centering arm at a portion of the first centering arm between the first end and the opposing second end of the first centering arm.

45. The system of claim 44, wherein the self-centering assembly further includes a second self-centering sub-assembly having:

a second centering arm having (i) a first end pivotally coupled to the cross member and (ii) a second opposing end including a second cam roller configured to engage the second support frame; and a second centering cylinder having (i) a first end pivotally coupled to the cross member and (ii) a second opposing end pivotally coupled to the second centering arm at a portion of the second centering arm between the first end and the opposing second end of the second centering arm.

46. The system of claim 43, wherein the self-centering assembly extends from the cross member between the first and the second support frames.

47. The system of claim 43, further comprising an anti-rotational arm pivotally coupled to the first support frame and pivotally coupled to the measurement axle assembly such that rotation of the body of the measurement axle assembly about the measurement-axle axis is prevented.

48. A deployable gage restraint measurement system for use in measuring a gage of a track having two generally parallel rails, the system comprising:

a cross member configured to couple the deployable gage restraint measurement system to a vehicle;

a measurement axle assembly including a body, a first axle extending from the body in a first direction, a second axle extending from the body in an opposing second direction, a first wheel coupled to the first axle such that the first wheel is rotatable about a measurement-axle axis, and a second wheel coupled to the second axle such that the second wheel is rotatable about the measurement-axle axis;

a first support frame coupled to the cross member such that the first support frame is rotatable about a first vertical axis;

a first vertical load cylinder having a first end and an opposing second end, the first end of the first load cylinder being pivotally coupled to the first support frame;

a first swing arm having a first end and an opposing second end, the first end of the first swing arm including a first spherical bearing attached to the first axle, the opposing second end of the first swing arm being pivotally coupled to the opposing second end of the first vertical load cylinder, the first swing arm being pivotally coupled to the first support frame at a portion of the first swing arm between the first end and the opposing second end of the first swing arm;

an anti-rotational arm pivotally coupled to the first support frame and pivotally coupled to the measurement axle assembly such that rotation of the body of the measurement axle assembly about the measurement-axle axis is prevented;

a second support frame coupled to the cross member such that the second support frame is rotatable about a second vertical axis;

a second vertical load cylinder having a first end and an opposing second end, the first end of the second load cylinder being pivotally coupled to the second support frame; and a second swing arm having a first end and an opposing second end, the first end of the second swing arm including a second spherical bearing attached to the second axle, the opposing second end of the second swing arm being pivotally coupled to the opposing second end of the second vertical load cylinder, the second swing arm being pivotally coupled to the second support frame at a portion of the second swing arm between the first end and the opposing second end of the second swing arm, wherein an extension of the first and the second vertical load cylinders causes the first and the second swing arms to pivot relative to the first and the second support frames in a first rotational direction, thereby deploying the measurement axle assembly onto the track.

49. The system of claim 48, wherein a retraction of the first and the second vertical load cylinders causes the first and the second swing arms to pivot relative to the first and the second support frames in an opposing second rotational direction, thereby lifting the measurement axle assembly off of the track.

50. The system of claim 48, further comprising a self-centering assembly configured to engage the first and the second support frames to aid in maintaining (i) a rotational position of the first support frame about the first vertical axis and (ii) a rotational position of the second support frame about the second vertical axis during deployment of the measurement axle assembly onto the track.

51. The system of claim 48, wherein the first swing arm further includes a laterally oriented latch pin to allow the first swing arm to be hung from a safety hook attached to a frame of the vehicle in a retracted position to aid in preventing the measurement axle assembly from deploying prematurely.

* * * * *